(12) United States Patent
Amano et al.

(10) Patent No.: US 10,809,504 B2
(45) Date of Patent: Oct. 20, 2020

(54) ZOOM LENS AND IMAGING APPARATUS

(71) Applicant: FUJIFILM Corporation, Tokyo (JP)

(72) Inventors: Masaru Amano, Saitama (JP); Masaru Yonezawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 250 days.

(21) Appl. No.: 15/978,223

(22) Filed: May 14, 2018

(65) Prior Publication Data

US 2018/0335604 A1 Nov. 22, 2018

(30) Foreign Application Priority Data

May 19, 2017 (JP) ................................. 2017-100396

(51) Int. Cl.
| | | |
|---|---|---|
| *G02B 15/17* | (2006.01) | |
| *G02B 27/00* | (2006.01) | |
| *G02B 13/02* | (2006.01) | |
| *G02B 15/167* | (2006.01) | |
| *G02B 15/14* | (2006.01) | |

(52) U.S. Cl.
CPC ............ *G02B 15/17* (2013.01); *G02B 13/02* (2013.01); *G02B 15/1465* (2019.08); *G02B 15/167* (2013.01); *G02B 27/0025* (2013.01)

(58) Field of Classification Search
CPC ... G02B 9/60; G02B 9/62; G02B 9/64; G02B 13/02; G02B 13/04; G02B 15/145–1461; G02B 15/16–17
USPC .................................. 359/676–695, 745–795
See application file for complete search history.

(56) References Cited

U.S. PATENT DOCUMENTS

| | | | | |
|---|---|---|---|---|
| 6,141,156 A * | 10/2000 | Aoki | ................... | G02B 15/173 359/554 |
| 7,542,213 B2 * | 6/2009 | Yamamoto | ........... | G02B 15/177 359/676 |
| 2011/0279898 A1 * | 11/2011 | Takemoto | ............ | G02B 27/646 359/557 |
| 2011/0317279 A1 * | 12/2011 | Takahashi | ............ | G02B 15/173 359/683 |

(Continued)

FOREIGN PATENT DOCUMENTS

| | | |
|---|---|---|
| JP | 2014-010282 A | 1/2014 |
| JP | 2016-071140 A | 5/2016 |
| JP | 2016-206409 A | 12/2016 |

*Primary Examiner* — Nicholas R. Pasko
(74) *Attorney, Agent, or Firm* — Studebaker & Brackett PC

(57) ABSTRACT

The zoom lens consists of, in order from an object side: a first lens group (G1) that remains stationary during zooming and has a positive refractive power; and a subsequent section that consists of five or more lens groups including at least four movable lens groups. The first lens group (G1) is set as an A constituent section (SA), and a lens closest to the object side in the A constituent section (SA) has a negative refractive power. A lens group having a stop is set as a C constituent section (SC), and the C constituent section (SC) moves to the object side during zooming from a wide-angle end to a telephoto end, and then moves toward an image side. A spacing between the A constituent section (SA) and the C constituent section (SC) is set as a B constituent section (SB), and the B constituent section (SB) consists of one or two the movable lens groups, and has a negative refractive power. In addition, the zoom lens satisfies predetermined conditional expressions.

20 Claims, 11 Drawing Sheets

(56) References Cited

U.S. PATENT DOCUMENTS

| | | | |
|---|---|---|---|
| 2012/0075494 A1* | 3/2012 | Katayose | G02B 15/173 |
| | | | 348/222.1 |
| 2013/0114144 A1* | 5/2013 | Heu | G02B 9/62 |
| | | | 359/557 |
| 2013/0120640 A1* | 5/2013 | Taki | G02B 15/20 |
| | | | 348/345 |
| 2014/0002714 A1* | 1/2014 | Eguchi | G02B 15/17 |
| | | | 348/345 |
| 2016/0091698 A1 | 3/2016 | Ikeda et al. | |
| 2016/0161725 A1* | 6/2016 | Shimomura | H04N 5/23238 |
| | | | 359/557 |
| 2016/0209632 A1* | 7/2016 | Imaoka | G02B 15/22 |
| 2018/0246303 A1* | 8/2018 | Kodaira | G02B 15/14 |

* cited by examiner

EXAMPLE 1

EXAMPLE 2

EXAMPLE 3

WIDE-ANGLE END

MIDDLE

TELEPHOTO END

EXAMPLE 4

EXAMPLE 5

EXAMPLE 2

EXAMPLE 3

EXAMPLE 4

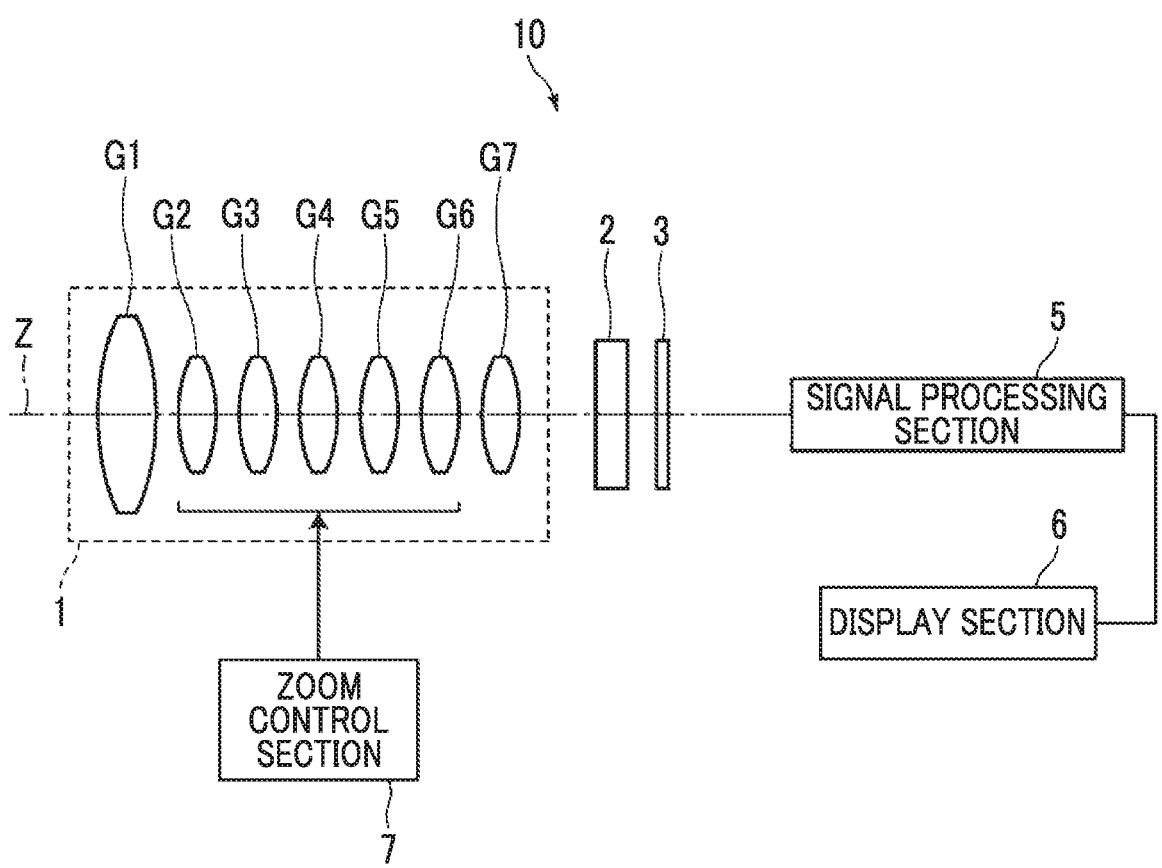

ZOOM LENS AND IMAGING APPARATUS

CROSS REFERENCE TO RELATED APPLICATIONS

The present application claims priority under 35 U.S.C. § 119 to Japanese Patent Application No. 2017-100396 filed on May 19, 2017. The above application is hereby expressly incorporated by reference, in its entirety, into the present application.

BACKGROUND OF THE INVENTION

1. Field of the Invention

The present invention relates to a zoom lens suitable for electronic cameras such as movie imaging cameras, broadcast cameras, digital cameras, video cameras, and surveillance cameras, and to an imaging apparatus comprising the zoom lens.

2. Description of the Related Art

As zoom lenses used in electronic cameras such as movie imaging cameras, broadcast cameras, digital cameras, video cameras, and surveillance cameras, zoom lenses disclosed in JP2016-71140A. JP2014-10282A, and JP2016-206409A have been proposed.

SUMMARY OF THE INVENTION

In imaging apparatuses such as movie imaging cameras and broadcast cameras, there is a demand for a zoom lens that has favorable optical performance with a high magnification while having a small size. In particular, reduction in size is strongly demanded for imaging modes focusing on maneuverability and operability.

In the zoom lenses of JP2016-71140A, JP2014-10282A, and JP2016-206409A, fluctuation in aberration caused by zooming is corrected by moving five or more lens groups and varying a plurality of group distances. However, magnifications of the zoom lenses of JP2016-71140A and JP2014-10282A are not sufficiently high. In addition, the zoom lens of JP2016-206409A has a short back focal length and can not be mounted on a mount-exchange type broadcast camera or a movie camera.

The present invention has been made in consideration of the above-mentioned situations, and it is an object of the present invention to provide a zoom lens, which has a favorable optical performance with a high magnification while maintaining a sufficient back focal length and having a small size, and an imaging apparatus comprising the zoom lens.

According to the present invention, there is provided a zoom lens consisting of, in order from an object side: a first lens group that remains stationary with respect to an image plane during zooming and has a positive refractive power; and a subsequent section that consists of five or more lens groups including at least four movable lens groups which are moved by changing distances between the movable lens groups and adjacent groups in a direction of an optical axis during zooming. the first lens group is set as an A constituent section, and a lens closest to the object side in the A constituent section has a negative refractive power. the subsequent section includes a lens group having a stop, the lens group having the stop is set as a C constituent section, and the C constituent section moves to the object side during zooming from a wide-angle end to a telephoto end, and then moves toward an image side. a spacing between the A constituent section and the C constituent section is set as a B constituent section, and the B constituent section consists of one or two the movable lens groups, and has a negative refractive power as a whole at the wide-angle end. In addition, assuming that a lateral magnification of the B constituent section at the telephoto end is βTB, a lateral magnification of the B constituent section at the wide-angle end is βWB, and a zoom magnification is Zr, Conditional Expression (1) is satisfied.

$$1.3 < \beta TB/\beta WB/Zr < 5 \tag{1}$$

It is preferable that Conditional Expression (1-1) is satisfied.

$$1.5 < \beta TB/\beta WB/Zr < 4 \tag{1-1}$$

In the zoom lens of the present invention, it is preferable that the C constituent section has a negative refractive power.

It is preferable that the subsequent section has the two or more movable lens groups having positive refractive powers on the image side of the C constituent section.

It is preferable that a lens group adjacent to the image side in the C constituent section is the movable lens group having a positive refractive power, and the movable lens group adjacent to the image side in the C constituent section is a D constituent section. Assuming that a gutter magnification of the D constituent section at the telephoto end is gtT, and a gutter magnification of the D constituent section at the wide-angle end is gtW, it is preferable that Conditional Expression (2) is satisfied, and it is more preferable that Conditional Expression (2-1) is satisfied.

$$1.2 < gtT/gtW < 3 \tag{2}$$

$$1.5 < gtT/gtW < 2.5 \tag{2-1}$$

Here, gtT and gtW are represented by the following expressions. It should be noted that a lateral magnification of the D constituent section at the telephoto end is βTD, a lateral magnification of the E constituent section at the telephoto end in a case where all the lens groups located to be closer to the image side than the D constituent section are combined to be set as an E constituent section is βTE, a lateral magnification of the D constituent section at the wide-angle end is βWD, and a lateral magnification of the E constituent section at the wide-angle end in a case where all the lens groups located to be closer to the image side than the D constituent section are combined to be set as an E constituent section is βWE.

$$gtT = (1-\beta TD^2) \times \beta TE^2$$

$$gtW = (1-\beta WD^2) \times \beta WE^2$$

It is preferable that the C constituent section is positioned to be closest to the object side at a position closer to a wide-angle side than a position where a lateral magnification βB of the B constituent section is −1.

It is preferable that the C constituent section has a stop at a position closest to the object side.

It is preferable that the C constituent section consists of a stop, a positive lens, and a negative lens.

Assuming that a focal length of the B constituent section is fB and a focal length of the A constituent section is fA, it is preferable that Conditional Expression (3) is satisfied, and it is more preferable that Conditional Expression (3-1) is satisfied.

$$-1<fB/fA<0 \qquad (3)$$

$$-0.5<fB/fA<-0.1 \qquad (3-1)$$

Assuming that a focal length of the C constituent section is fC, and a focal length of the B constituent section is fB, it is preferable that Conditional Expression (4) is satisfied, and it is more preferable that Conditional Expression (4-1) is satisfied.

$$2<fC/fB<4 \qquad (4)$$

$$2.5<fC/fB<3.7 \qquad (4-1)$$

Assuming that an Abbe number at a d line is νd, and a partial dispersion ratio is θgF, it is preferable that the A constituent section has two or more positive lenses satisfying Conditional Expressions (5) and (6), and it is more preferable that the positive lenses satisfying Conditional Expressions (5) and (6) satisfy at least one of Conditional Expressions (5-1) or (6-1).

$$70<\nu d \qquad (5)$$

$$90<\nu d<99 \qquad (5-1)$$

$$0.64<\theta gF+0.001625\times\nu d<0.71 \qquad (6)$$

$$0.65<\theta gF+0.001625\times\nu d<0.70 \qquad (6-1)$$

It is preferable that the B constituent section consists of, in order from the object side, the movable lens group having a negative refractive power, and the movable lens group having a positive refractive power.

In this case, assuming that a focal length of the movable lens group having a negative refractive power in the B constituent section is fB1, and a focal length of the movable lens group having a positive refractive power in the B constituent section is fB2, it is preferable that Conditional Expression (7) is satisfied, and it is more preferable that Conditional Expression (7-1) is satisfied.

$$-1<fB1/fB2<0 \qquad (7)$$

$$-0.5<fB1/fB2<-0.05 \qquad (7-1)$$

It is preferable that an image side part of the C constituent section of the subsequent section consists of, in order from the object side, the two movable lens groups that have positive refractive powers, and a stationary lens group that remains stationary with respect to the image plane during zooming and has a positive refractive power.

An imaging apparatus of the present invention comprises the above-mentioned zoom lens of the present invention.

It should be noted that the term "consists of ~" means that the imaging lens may include not only the above-mentioned elements but also lenses substantially having no powers, optical elements, which are not lenses, such as a stop, a mask, a cover glass, and a filter, and mechanism parts such as a lens flange, a lens barrel, an imaging element, and a camera shaking correction mechanism.

Further, surface shapes, signs of refractive powers, radii of curvature of the lenses are assumed as those in paraxial regions in a case where some lenses have aspheric surfaces.

The zoom lens of the present invention consists of, in order from an object side: a first lens group that remains stationary with respect to an image plane during zooming and has a positive refractive power; and a subsequent section that consists of five or more lens groups including at least four movable lens groups which are moved by changing distances between the movable lens groups and adjacent groups in a direction of an optical axis during zooming. the first lens group is set as an A constituent section, and a lens closest to the object side in the A constituent section has a negative refractive power. the subsequent section includes a lens group having a stop, the lens group having the stop is set as a C constituent section, and the C constituent section moves to the object side during zooming from a wide-angle end to a telephoto end, and then moves toward an image side. A spacing between the A constituent section and the C constituent section is set as a B constituent section, and the B constituent section consists of one or two the movable lens groups, and has a negative refractive power as a whole at the wide-angle end. In addition, assuming that a lateral magnification of the B constituent section at the telephoto end is βTB, a lateral magnification of the B constituent section at the wide-angle end is βWB, and a zoom magnification is Zr, Conditional Expression (1) is satisfied. Therefore, it is possible to provide a zoom lens, which has favorable optical performance with a high magnification while maintaining a sufficient back focal length and having a small size, and an imaging apparatus comprising the zoom lens.

$$1.3<\beta TB/\beta WB/Zr<5 \qquad (1)$$

BRIEF DESCRIPTION OF THE DRAWINGS

FIG. 11 is a schematic configuration diagram of an imaging apparatus according to an embodiment of the present invention.

DESCRIPTION OF THE PREFERRED EMBODIMENTS

Figure 1:
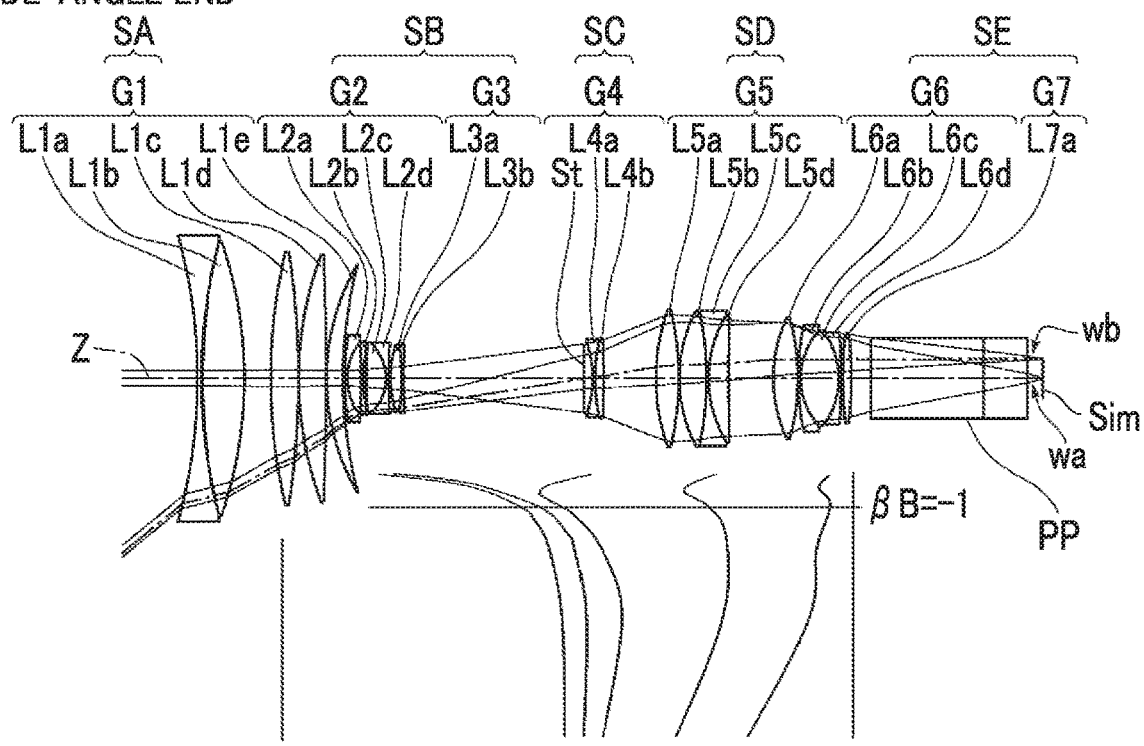
FIG. 1 is a cross-sectional view illustrating a lens configuration of a zoom lens (common to Example 1) according to an embodiment of the present invention.
Figure 1:
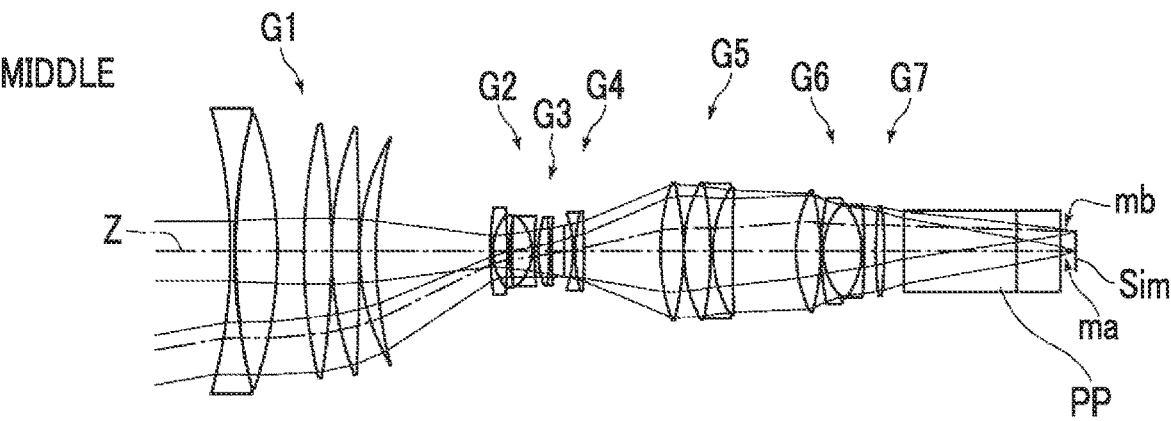
Figure 1:
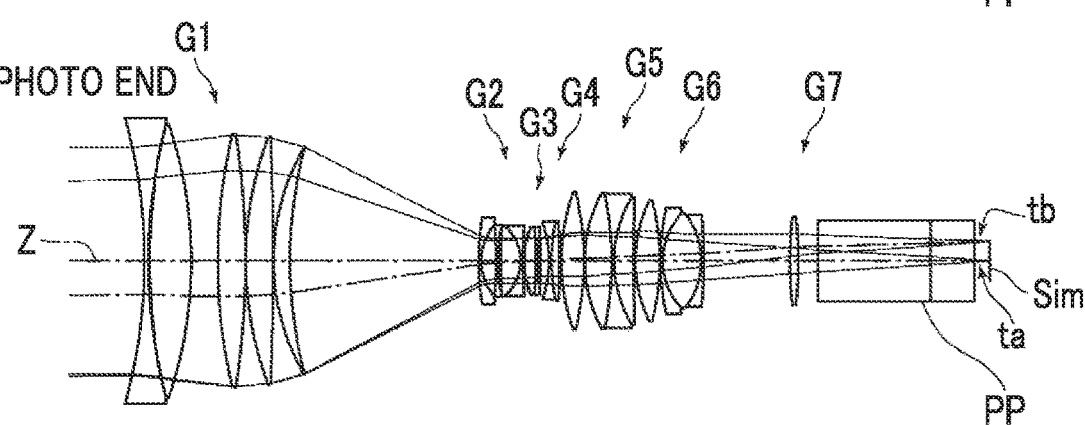

Hereinafter, embodiments of the present invention will be described with reference to drawings. FIG. 1 is a cross-sectional view illustrating a lens configuration of a zoom lens according to an embodiment of the present invention. The exemplary configuration shown in FIG. 1 is the same as the configuration of the zoom lens of Example 1. In FIG. 1, the left side is an object side, and the right side is an image side. In addition, an aperture stop St shown in the drawing does not necessarily show its real size and shape, but show a position on an optical axis Z.

In FIG. 1, the wide-angle end state is shown in the upper part, on-axis rays wa and rays with the maximum angle of view wb are shown as rays. The middle position state is shown in the middle part, on-axis rays ma and rays with the maximum angle of view mb are shown as rays. In addition, the telephoto end state is shown in the lower part, and on-axis rays ta and rays with the maximum angle of view tb are shown as rays. All of these show a state in which the object at infinity is in focus. Here, the middle position is a position at which the C constituent section composed of the movable lens groups is moved to be closest to the object side.

In order to mount the zoom lens on an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The zoom lens of the present embodiment consists of, in order from the object side: a first lens group G1 that remains stationary with respect to an image plane Sim during zooming and has a positive refractive power; and a subsequent section that consists of five or more lens groups including at least four movable lens groups which are moved by changing distances between the movable lens groups and adjacent groups in the direction of the optical axis during zooming.

In such a manner, by forming the first lens group G1 closest to the object side as a lens group having a positive refractive power, it is possible to shorten the total length of the lens system, and this configuration is advantageous for reduction in size. Further, by making the lens group stationary with respect to the image plane Sim during zooming, it is possible to reduce movement of the barycenter caused by the zooming.

The first lens group G1 is set as an A constituent section SA, and a lens closest to the object side in the A constituent section SA has a negative refractive power. The subsequent section includes a lens group having an aperture stop St, the lens group having the aperture stop St is set as a C constituent section SC, and the C constituent section SC moves to the object side during zooming from a wide-angle end to a telephoto end, and then moves toward an image side. A spacing between the A constituent section SA and the C constituent section SC is set as a B constituent section SB, and the B constituent section SB consists of one or two the movable lens groups, and has a negative refractive power as a whole at the wide-angle end.

In the A constituent section SA, the negative lens is disposed to be closest to the object side. Thereby, it is possible to minimize the incidence angle of off-axis rays from the object side to the second and subsequent lenses, and there is an advantage in achieving the wide angle.

The B constituent section SB has a negative refractive power, and thus has a main function of the zooming.

The C constituent section SC moves toward the object side during zooming from the wide-angle end to the telephoto end, and then moves toward the image side. Thereby, the movement stroke of the B constituent section SB, which has the main function of the zooming at a position closer to the object side than the aperture stop St, and there is an advantage in achieving high magnification. Further, in a case where the aperture stop St is configured to move toward the object side at a position closer to the telephoto side than the wide-angle end, it is possible to minimize the incidence height of the off-axial rays. As a result, there is an advantage in reducing the size of the A constituent section SA (first lens group G1).

Assuming that a lateral magnification of the B constituent section SB at the telephoto end is $\beta TB$, a lateral magnification of the B constituent section SB at the wide-angle end is $\beta WB$, and a zoom magnification is $Zr$, Conditional Expression (1) is satisfied. By appropriately setting the zooming function of the B constituent section SB at a position closer to the object side than the C constituent section SC including the aperture stop St so as to satisfy Conditional Expression (1), it is possible to achieve both high magnification and high performance. By not allowing the result of Conditional Expression (1) to be equal to or less than the lower limit, a zooming efficiency of the B constituent section SB is ensured, and thus there is an advantage in achieving high magnification. Further, in order to increase the zooming efficiency, it is necessary to increase the amount of zoom movement or to strengthen the refractive power of the B constituent section SB as a variator group. However, in order to achieve both high magnification and compactness, it is necessary to strengthen the negative refractive power of the variator group while suppressing the amount of zoom movement. Thus, by not allowing the result of Conditional Expression (1) to be equal to or less than the lower limit, it becomes easy to ensure the back focal length while keeping the total length short. By not allowing the result of Conditional Expression (1) to be equal to or greater than the upper limit, it is possible to prevent the zooming function of the B constituent section SB from becoming excessively large, and there is an advantage in suppressing fluctuation in aberration during zooming. In addition, in a case where at least one of Conditional Expression (1-1) or (1-2) is satisfied, it is possible to obtain more favorable characteristics.

$$1.3 < \beta TB/\beta WB/Zr < 5 \tag{1}$$

$$1.5 < \beta TB/\beta WB/Zr < 4 \tag{1-1}$$

$$1.7 < \beta TB/\beta WB/Zr < 3.5 \tag{1-2}$$

In the zoom lens of the present embodiment, it is preferable that the C constituent section SC has a negative refractive power. With such a configuration, it is possible to obtain the movement stroke of the B constituent section SB, which has the main zooming function, at a position closer to the object side than the aperture stop St, and there is an advantage in high magnification. There is an advantage in ensuring the back focal length of the whole system.

It is preferable that the subsequent section has the two or more movable lens groups having positive refractive powers on the image side of the C constituent section SC. With such a configuration, it is possible to satisfactorily correct fluctuations in spherical aberration, curvature of field, astigmatism, and lateral chromatic aberration caused by zooming while providing an image forming function with positive refractive power.

It is preferable that a lens group adjacent to the image side in the C constituent section SC is the movable lens group having a positive refractive power, and the movable lens group adjacent to the image side in the C constituent section SC is a D constituent section SD. Assuming that a gutter magnification of the D constituent section SD at the telephoto end is gtT, and a gutter magnification of the D constituent section SD at the wide-angle end is gtW, it is preferable that Conditional Expression (2) is satisfied. By not allowing the result of Conditional Expression (2) to be equal to or less than the lower limit, it is possible to prevent the correction effect of the image forming position on the telephoto side of the D constituent section SD from becoming excessively weak. Thus, by minimizing the amount of movement on the telephoto side, there is an advantage in achieving reduction in size of the whole system. By not allowing the result of Conditional Expression (2) to be equal to or greater than the upper limit, it is possible to prevent the correction effect of the image forming position on the telephoto side of the D constituent section SD from becoming excessively strong, and it becomes unnecessary to perform control with high accuracy. In addition, in a case where at least one of Conditional Expression (2-1) or (2-2) is satisfied, it is possible to obtain more favorable characteristics.

$$1.2 < gtT/gtW < 3 \tag{2}$$

$$1.5 < gtT/gtW < 2.5 \tag{2-1}$$

$$1.6 < gtT/gtW < 2.4 \tag{2-2}$$

It is preferable that the C constituent section SC is positioned to be closest to the object side at a position closer to a wide-angle side than a position where a lateral magnification $\beta B$ of the B constituent section SB is $-1$. In a case where the A constituent section SA consisting of the first lens group G1 having a positive refractive power at a position closest to the object side remains stationary with respect to the image plane Sim during zooming, the off-axis principal rays passing through the A constituent section SA are highest between the wide-angle end and the position at which the lateral magnification $\beta B$ of the B constituent section SB is $-1$. Therefore, by positioning the C constituent section SC at a position closest to the object side between the wide-angle end and the position at which the lateral magnification $\beta B$ of the B constituent section SB is $-1$, there is an advantage in achieving reduction in size of the A constituent section SA.

It is preferable that the C constituent section SC has the aperture stop St at a position closest to the object side. Since the aperture stop St is positioned to be closest to the object side of the C constituent section SC, it is possible to reduce the incidence height of the off-axial rays on the wide-angle side, and there is an advantage in achieving reduction in size of the A constituent section SA.

It is preferable that the C constituent section SC consists of the aperture stop St, a positive lens, and a negative lens. The C constituent section SC has a function of mainly correcting fluctuation in the image plane position caused by zooming, and comprises the positive lens and the negative lens in the C constituent section SC. Thereby, it is possible to satisfactorily correct spherical aberration and longitudinal chromatic aberration.

Assuming that a focal length of the B constituent section SB is fB and a focal length of the A constituent section SA is fA, it is preferable that Conditional Expression (3) is satisfied. By not allowing the result of Conditional Expression (3) to be equal to or less than the lower limit, the refractive power of the B constituent section SB having the zooming function is ensured. As a result, it is possible to easily achieve high magnification. By not allowing the result of Conditional Expression (3) to be equal to or greater than the upper limit, it is possible to prevent the zooming function of the B constituent section SB from becoming excessively large, and it is possible to easily suppress fluctuation in aberration during zooming. Alternatively, it is possible to prevent the refractive power of the A constituent section SA from becoming excessively weak, which contributes to reduction in size of the A constituent section SA. In addition, in a case where at least one of Conditional Expression (3-1) or (3-2) is satisfied, it is possible to obtain more favorable characteristics.

$$-1 < fB/fA < 0 \tag{3}$$

$$-0.5 < fB/fA < -0.1 \tag{3-1}$$

$$-0.3 < fB/fA < -0.15 \tag{3-2}$$

Assuming that a focal length of the C constituent section SC is fC, and a focal length of the B constituent section SB is fB, it is preferable that Conditional Expression (4) is satisfied. By not allowing the result of Conditional Expression (4) to be equal to or less than the lower limit, the refractive power of the B constituent section SB having the zooming function is ensured. As a result, it is possible to easily achieve high magnification. By not allowing the result of Conditional Expression (4) to be equal to or greater than the upper limit, it is possible to prevent the zooming function of the B constituent section SB from becoming excessively large, and it is possible to easily suppress fluctuation in aberration during zooming. In addition, in a case where at least one of Conditional Expression (4-1) or (4-2) is satisfied, it is possible to obtain more favorable characteristics.

$$2 < fC/fB < 4 \tag{4}$$

$$2.5 < fC/fB < 3.7 \tag{4-1}$$

$$3 < fC/fB < 3.5 \tag{4-2}$$

Assuming that an Abbe number at a d line is $\nu d$, and a partial dispersion ratio is $\theta gF$, it is preferable that the A constituent section SA has two or more positive lenses satisfying Conditional Expressions (5) and (6). By not allowing the result of Conditional Expression (5) to be equal to or less than the lower limit, it is possible to satisfactorily correct the lateral chromatic aberration on the wide-angle side and the longitudinal chromatic aberration on the telephoto side. By not allowing the result of Conditional Expression (5) to be equal to or greater than the upper limit, it is possible to satisfactorily correct various aberrations such as spherical aberration by ensuring a necessary refractive index while satisfactorily correcting longitudinal chromatic aberration. By satisfying Conditional Expression (6) together with Conditional Expression (5), it is possible to satisfactorily correct the secondary spectrum. In a case where the positive lenses satisfying the Conditional Expressions (5) and (6) satisfy at least one of Conditional Expression (5-1) or (6-1), it is possible to obtain more favorable characteristics.

$$70 < \nu d \tag{5}$$

$$90 < \nu d < 99 \tag{5-1}$$

$$0.64 < \theta gF + 0.001625 \times \nu d < 0.71 \tag{6}$$

$$0.65 < \theta gF + 0.001625 \times \nu d < 0.70 \tag{6-1}$$

It is preferable that the B constituent section SB consists of, in order from the object side, the movable lens group having a negative refractive power, and the movable lens group having a positive refractive power. With such a configuration, it is possible to satisfactorily correct fluctuations in spherical aberration, curvature of field, astigmatism, and lateral chromatic aberration caused by zooming while providing the zooming function with negative refractive power.

In this case, assuming that a focal length of the movable lens group having a negative refractive power in the B constituent section SB is fB1, and a focal length of the movable lens group having a positive refractive power in the B constituent section SB is fB2, it is preferable that Conditional Expression (7) is satisfied. In Examples 1, 2, 4, and 5 to be described below, the second lens group G2 has a negative refractive power and the third lens group G3 has a positive refractive power in the B constituent section SB. By not allowing the result of Conditional Expression (7) to be equal to or less than the lower limit, it is possible to prevent the zooming function of the B constituent section SB from becoming excessively weak, and there is an advantage in high magnification. By not allowing the result of Conditional Expression (7) to be equal to or greater than the upper limit, it is possible to prevent the zooming function of the B constituent section SB from becoming excessively strong, and there is an advantage in suppressing fluctuation in aberration during zooming. In addition, in a case where at least one of Conditional Expression (7-1) or (7-2) is satisfied, it is possible to obtain more favorable characteristics.

$$-1 < fB1/fB2 < 0 \quad (7)$$

$$-0.5 < fB1/fB2 < -0.05 \quad (7\text{-}1)$$

$$-0.2 < fB1/fB2 < -0.07 \quad (7\text{-}2)$$

It is preferable that an image side part of the C constituent section SC of the subsequent section consists of, in order from the object side, the two movable lens groups that have positive refractive powers, and a stationary lens group that remains stationary with respect the image plane Sim during zooming and has a positive refractive power. With such a configuration, it is possible to satisfactorily correct fluctuations in spherical aberration, curvature of field, astigmatism, and lateral chromatic aberration caused by zooming while two positive movable lens groups have the image forming function with positive refractive power. By providing a positive stationary lens group closest to the image side, it is possible to effectively correct lateral chromatic aberration.

In the example shown in FIG. 1, the optical member PP is disposed between the lens system and the image plane Sim. However, various filters such as a lowpass filter and a filter for cutting off a specific wavelength region may not be disposed between the lens system and the image plane Sim. Instead, such various filters may be disposed between the lenses, or coating for functions the same as those of various filters may be performed on a lens surface of any lens.

Next, numerical examples of the zoom lens of the present invention will be described. First, a zoom lens of Example 1 will be described. FIG. 1 is a cross-sectional view illustrating a lens configuration of the zoom lens of Example 1. In FIG. 1 and FIGS. 2 to 5 corresponding to Examples 2 to 5 to be described later, left sides thereof are the object side, and right sides thereof are the image side. In addition, the aperture stop St shown in the drawings does not necessarily indicate its size or shape, and indicates a position thereof on the optical axis Z. In addition, the wide-angle end state is shown in the upper part, on-axis rays wa and rays with the maximum angle of view wb are shown as rays. The middle position state is shown in the middle part, on-axis rays ma and rays with the maximum angle of view mb are shown as rays. In addition, the telephoto end state is shown in the lower part, and on-axis rays ta and rays with the maximum angle of view tb are shown as rays. All of these show a state in which the object at infinity is in focus. Here, the middle position is a position at which the C constituent section composed of the movable lens groups is moved to be closest to the object side.

The zoom lens of Example 1 is composed of, in order from the object side, a first lens group G1 composed of five lenses L1a to L1e, a second lens group G2 composed of four lenses L2a to L2d, a third lens group G3 composed of two lenses L3a and L3b, a fourth lens group G4 composed of an aperture stop St and two lenses L4a and L4b, a fifth lens group G5 composed of four lenses L5a to L5d, a sixth lens group G6 composed of four lenses L6a to L6d, and a seventh lens group G7 composed of one lens L7a.

The A constituent section SA is composed of only the first lens group G1, the B constituent section SB is composed of the second lens group G2 and the third lens group G3, and the C constituent section SC is composed of only the fourth lens group G4, The D constituent section SD is composed of only the fifth lens group G5, and the E constituent section SE is composed of the sixth lens group G6 and the seventh lens group G7.

Table 1 shows basic lens data of the zoom lens of Example 1, Table 2 shows data about specification, Table 3 shows data about variable surface distances, and Table 4 shows data about aspheric coefficients. Hereinafter, meanings of the reference signs in the tables are, for example, as described in Example 1, and are basically the same as those in Examples 2 to 5.

In the lens data of Table 1, the column of the surface number shows surface numbers. The surface of the elements closest to the object side is the first surface, and the surface numbers sequentially increase toward the image plane side. The column of the radius of curvature shows radii of curvature of the respective surfaces. The column of the surface distance shows distances on the optical axis Z between the respective surfaces and the subsequent surfaces. Further, the column of n shows a refractive index of each optical element at the d line (a wavelength of 587.6 nm (nanometers)), the column of ν shows an Abbe number of each optical element at the d line (a wavelength of 587.6 nm (nanometers)), and the column of θgF shows a partial dispersion ratio of each optical element.

In addition, the partial dispersion ratio θgF is represented by the following expression.

$$\theta gF = (ng - nF)/(nF - nC)$$

Here, ng is a refractive index at the g line,
nF is a refractive index at the F line, and
nC is a refractive index at the C line.

In addition, the sign of the radius of curvature is positive in a case where a surface has a shape convex toward the object side, and is negative in a case where a surface has a shape convex toward the image plane side. In the basic lens data, the aperture stop St and the optical member PP are additionally noted. In a place of a surface number of a surface corresponding to the aperture stop St, the surface number and a term of (stop) are noted. Further, in the lens data of Table 1, in each place of the surface distance which is variable during zooming and focusing, DD[surface number] is noted. Numerical values each corresponding to the DD[surface number] are shown in Table 3.

In the data about the specification of Table 2, values of the zoom magnification, the focal length f′, the back focal length Bf′, the F number FNo., and the total angle of view 2ω(°) are noted.

In the lens data of Table 1, the reference sign * is attached to surface numbers of aspheric surfaces, and radii of curvature of the aspheric surfaces are represented by numerical values of paraxial radii of curvature. The data about aspheric coefficients of Table 4 shows the surface numbers of the aspheric surfaces and aspheric coefficients of the aspheric surfaces. The "E±n" (n: an integer) in numerical values of the aspheric coefficients of Table 4 indicates "×10±n". The aspheric coefficients are values of the coefficients KA and Am in aspheric surface expression represented as the following expression.

$$Zd = C \cdot h / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, KA and Am are aspheric coefficients, and Σ at the aspheric surface depth Zd means a sum with respect to m.

In the basic lens data, the data about specification, and the data about variable surface distances, a degree is used as a unit of an angle, and mm (millimeters) is used as a unit of a length, but appropriate different units may be used since the optical system can be used even in a case where the system is enlarged or reduced in proportion.

TABLE 1

Example 1•Lens Data (n and ν are Based on d Line)

| Surface Number | Radius of Curvature | Surface Spacing | n | ν | θ g, f |
|---|---|---|---|---|---|
| *1 | −145.50144 | 1.169 | 1.720467 | 34.71 | 0.5835 |
| 2 | 140.31320 | 0.353 | | | |
| *3 | 144.62516 | 12.500 | 1.433871 | 95.18 | 0.5373 |
| 4 | −115.94923 | DD[4] | | | |
| 5 | 149.12137 | 8.176 | 1.433871 | 95.18 | 0.5373 |
| 6 | −224.18863 | 0.101 | | | |
| 7 | 96.27410 | 7.980 | 1.433871 | 95.18 | 0.5373 |
| 8 | −829.95478 | DD[8] | | | |
| 9 | 61.83753 | 4.789 | 1.725666 | 49.35 | 0.5558 |
| 10 | 120.09878 | DD[10] | | | |
| *11 | 80.37514 | 0.700 | 2.001003 | 29.13 | 0.5995 |
| 12 | 15.35893 | 4.270 | | | |
| 13 | −123.88625 | 0.701 | 1.896544 | 39.43 | 0.5705 |
| 14 | 50.42943 | 0.751 | | | |
| 15 | 164.49409 | 5.780 | 1.892785 | 20.36 | 0.6394 |
| 16 | −13.00018 | 0.711 | 1.882991 | 39.70 | 0.5691 |
| 17 | 117.98457 | DD[17] | | | |
| 18 | 28.42392 | 3.242 | 1.527229 | 63.95 | 0.5390 |
| 19 | −76.07112 | 0.701 | 1.882990 | 39.70 | 0.5691 |
| 20 | 173.56352 | DD[20] | | | |
| 21(Stop) | ∞ | 2.501 | | | |
| 22 | −31.46722 | 0.711 | 1.894640 | 39.62 | 0.5700 |

TABLE 1-continued

Example 1•Lens Data (n and ν are Based on d Line)

| Surface Number | Radius of Curvature | Surface Spacing | n | ν | θ g, f |
|---|---|---|---|---|---|
| 23 | 48.38690 | 2.477 | 1.914390 | 19.42 | 0.6461 |
| 24 | −224.76152 | DD[24] | | | |
| *25 | 55.65989 | 6.723 | 1.689373 | 46.34 | 0.5645 |
| *26 | −67.21927 | 0.100 | | | |
| 27 | 39.55911 | 7.922 | 1.561724 | 72.84 | 0.5424 |
| 28 | −89.84405 | 0.700 | 1.882990 | 39.70 | 0.5691 |
| 29 | 33.90213 | 5.760 | 1.561430 | 61.85 | 0.5423 |
| 30 | 536.21617 | DD[30] | | | |
| 31 | 38.14812 | 7.239 | 1.500418 | 64.98 | 0.5364 |
| 32 | −62.99151 | 0.101 | | | |
| 33 | 67.41065 | 0.701 | 1.882993 | 39.70 | 0.5691 |
| 34 | 19.07187 | 11.274 | 1.564840 | 54.66 | 0.5533 |
| 35 | −21.20635 | 0.701 | 1.877064 | 40.29 | 0.5676 |
| 36 | −157.00744 | DD[36] | | | |
| 37 | 106.95787 | 2.391 | 1.437001 | 95.10 | 0.5336 |
| 38 | −121.56127 | 5.800 | | | |
| 39 | ∞ | 33.000 | 1.608589 | 46.44 | 0.5666 |
| 40 | ∞ | 13.200 | 1.516329 | 64.05 | 0.5346 |
| 41 | ∞ | | | | |

TABLE 2

Example 1•Specification (d Line)

| | Wide-Angle End | Middle | Telephoto End |
|---|---|---|---|
| Zoom Magnification | 1.00 | 4.05 | 44.60 |
| f | 7.720 | 31.267 | 344.326 |
| Bf | 39.554 | 39.554 | 39.554 |
| FNo. | 1.85 | 1.85 | 5.40 |
| 2ω [°] | 76.60 | 19.40 | 1.82 |

TABLE 3

Example 1•Variable Surface Distance

| | Wide-Angle End | Middle | Telephoto End |
|---|---|---|---|
| DD[4] | 7.763 | 7.763 | 7.763 |
| DD[8] | 0.201 | 0.201 | 0.201 |
| DD[10] | 0.500 | 33.604 | 55.536 |
| DD[17] | 0.519 | 1.170 | 0.426 |
| DD[20] | 52.730 | 3.743 | 0.501 |
| DD[24] | 15.442 | 22.219 | 0.501 |
| DD[30] | 13.182 | 18.639 | 0.501 |
| DD[36] | 0.500 | 3.498 | 25.408 |

TABLE 4

| | Surface Number | | |
|---|---|---|---|
| | 1 | 3 | 11 |
| KA | 1.0000000E+00 | 1.0000000E+00 | 1.0000000E+00 |
| A3 | 0.0000000E+00 | 0.0000000E+00 | −1.6797038E−20 |
| A4 | 1.6833155E−07 | −3.3018178E−07 | −2.1722890E−06 |
| A5 | −1.6218537E−08 | 2.3931508E−08 | 1.4699380E−06 |
| A6 | 4.6233744E−10 | 4.7186271E−10 | −3.2491375E−07 |
| A7 | 9.0900562E−11 | −3.1903571E−10 | 2.1276370E−08 |
| A8 | −4.0965836E−12 | 1.7620807E−11 | 1.2103806E−09 |
| A9 | −1.5250446E−13 | 3.8790096E−14 | −1.6261009E−10 |
| A10 | 7.6966406E−15 | −2.3063396E−14 | −2.1944341E−12 |
| A11 | 1.1846398E−16 | 3.3221041E−16 | 5.0801790E−13 |
| A12 | −6.5023341E−18 | 9.8776326E−18 | 3.6156750E−15 |
| A13 | −4.3206306E−20 | −2.4380837E−19 | −7.4856001E−16 |

TABLE 4-continued

| | | | |
|---|---|---|---|
| A14 | 2.6037275E−21 | −6.0428212E−22 | −5.8468179E−18 |
| A15 | 5.9708852E−24 | 4.8605930E−23 | 4.2254609E−19 |
| A16 | −4.0260539E−25 | −2.9494273E−25 | 3.5046952E−21 |

| | Surface Number | |
|---|---|---|
| | 25 | 26 |
| KA | 1.0000000E+00 | 1.0000000E+00 |
| A4 | −1.0454424E−06 | 2.6720046E−06 |
| A6 | 3.0027203E−10 | 2.1232271E−10 |
| A8 | 3.1065947E−12 | 1.6356561E−12 |
| A10 | 3.8956449E−15 | 7.6578184E−15 |

Figure 6:
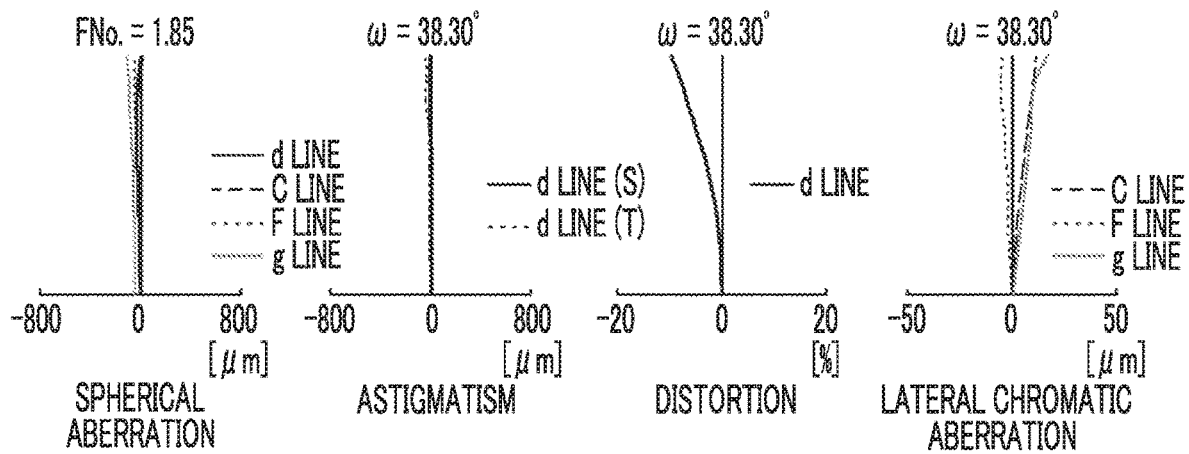
FIG. 6 is a diagram of aberrations of the zoom lens of Example 1 of the present invention.
Figure 6:
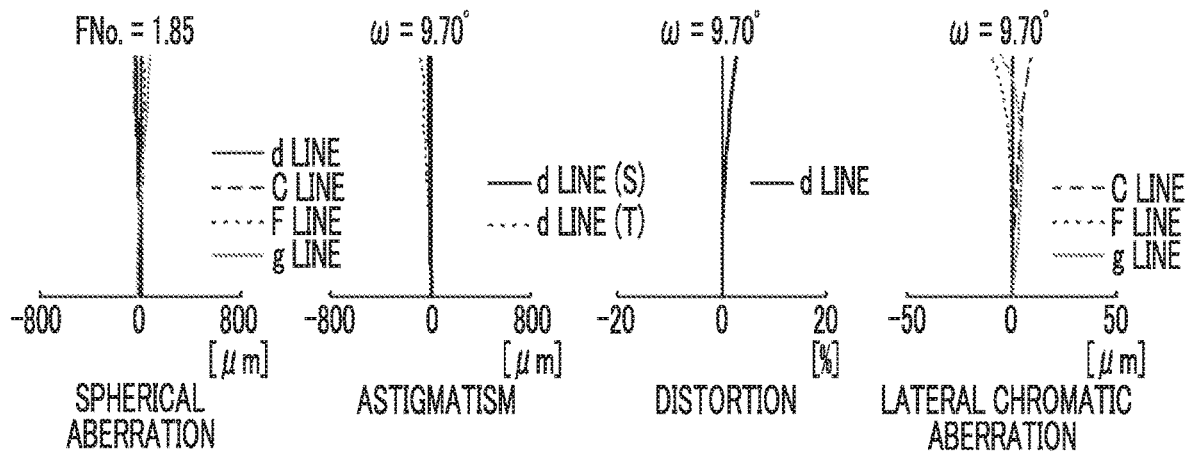
Figure 6:
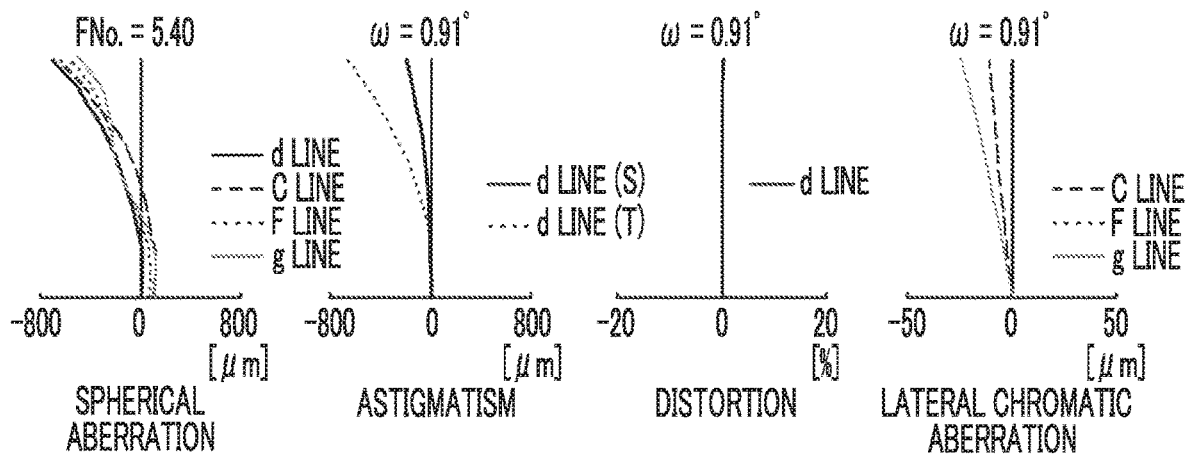

FIG. 6 shows aberration diagrams of the zoom lens of Example 1. In addition, spherical aberration, astigmatism, distortion, and lateral chromatic aberration at the wide-angle end are shown in order from the upper left side of FIG. 6, spherical aberration, astigmatism, distortion, and lateral chromatic aberration at the middle position are shown in order from the middle left side of FIG. 6, and spherical aberration, astigmatism, distortion, and lateral chromatic aberration at the telephoto end are shown in order from the lower left side of FIG. 6. Such aberration diagrams show aberrations in a state where the object distance is set as an infinite distance. The aberration diagrams illustrating spherical aberration, astigmatism, and distortion indicate aberrations that occur in a case where the d line (a wavelength of 587.6 nm (nanometers)) is set as a reference wavelength. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberrations in sagittal and tangential directions are respectively indicated by the solid line and the short dashed line. In the lateral chromatic aberration diagram, aberrations at the C line (a wavelength of 656.3 nm (nanometers)), the F line (a wavelength of 486.1 nm (nanometers)), and the g line (a wavelength of 435.8 nm (nanometers)) are respectively indicated by the long dashed line, the short dashed line, and the gray solid line. In addition, in the spherical aberration diagram, FNo. means an F number. In the other aberration diagrams, ω means a half angle of view.

Figure 2:
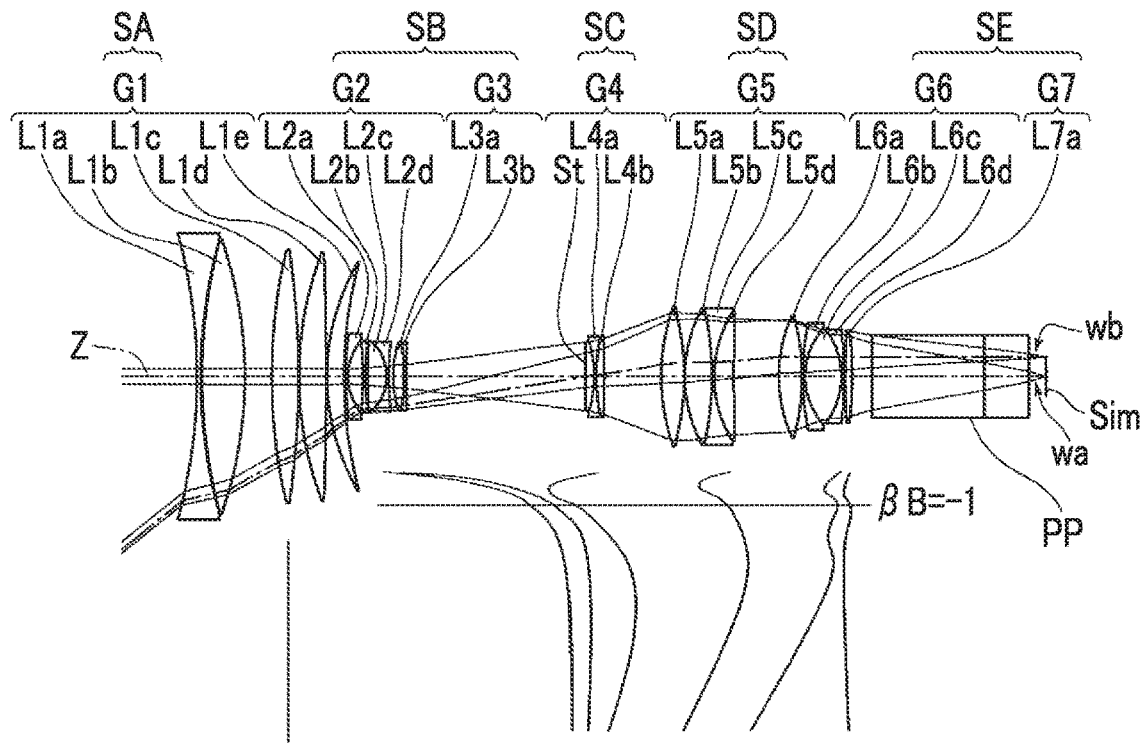
FIG. 2 is a cross-sectional view illustrating a lens configuration of a zoom lens of Example 2 of the present invention.
Figure 2:
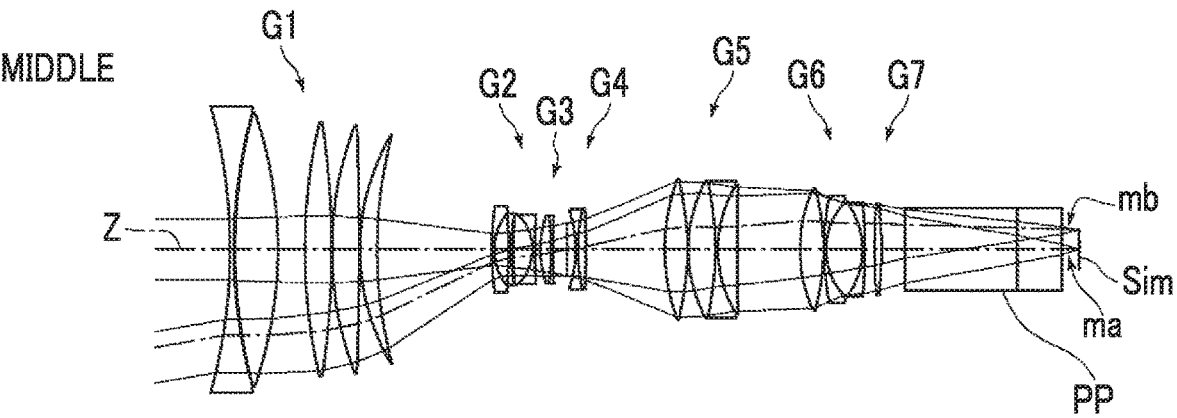
Figure 2:
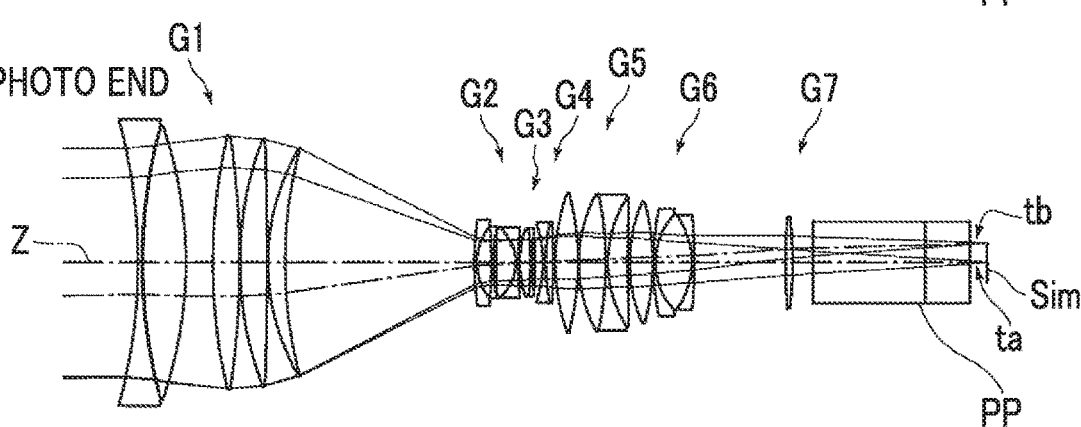
Figure 7:
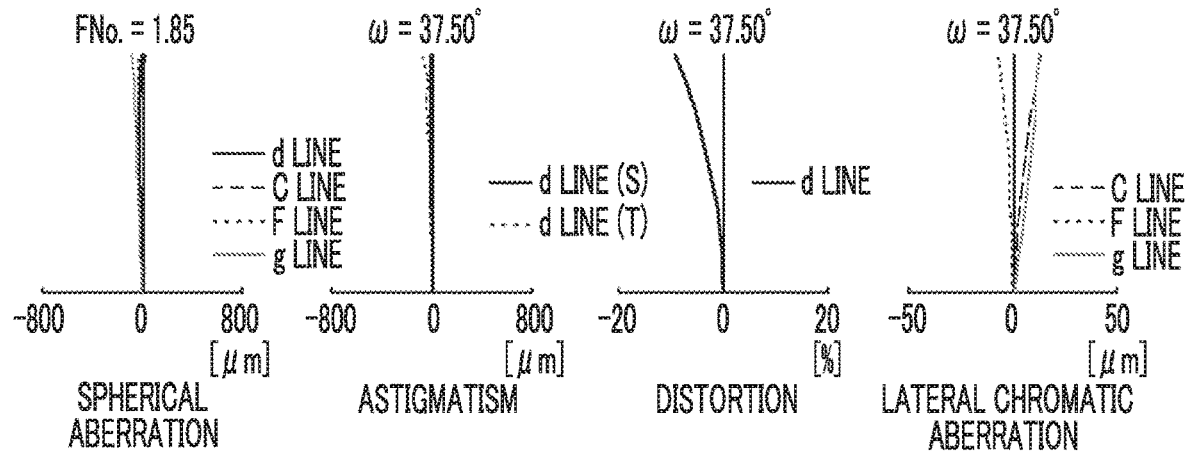
FIG. 7 is a diagram of aberrations of the zoom lens of Example 2 of the present invention.
Figure 7:
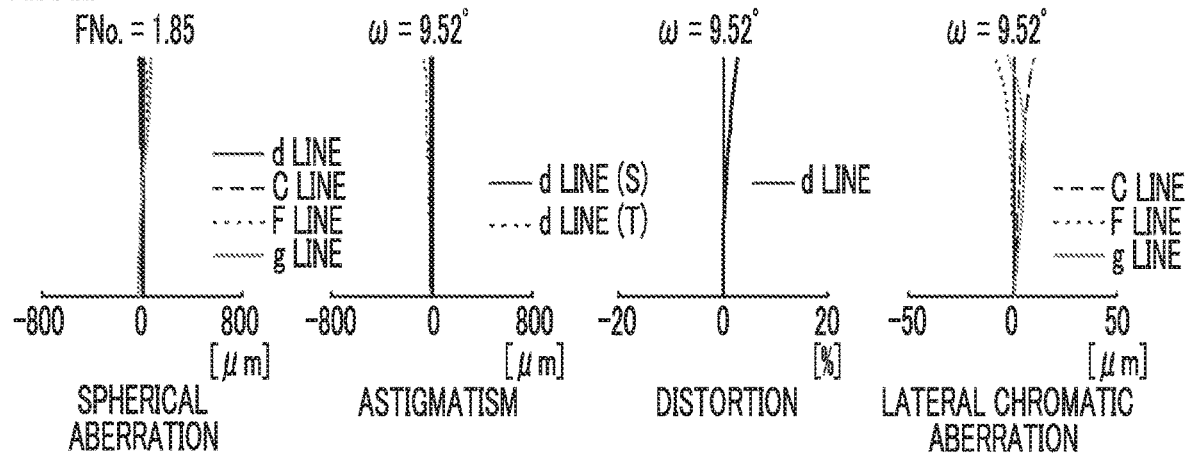
Figure 7:
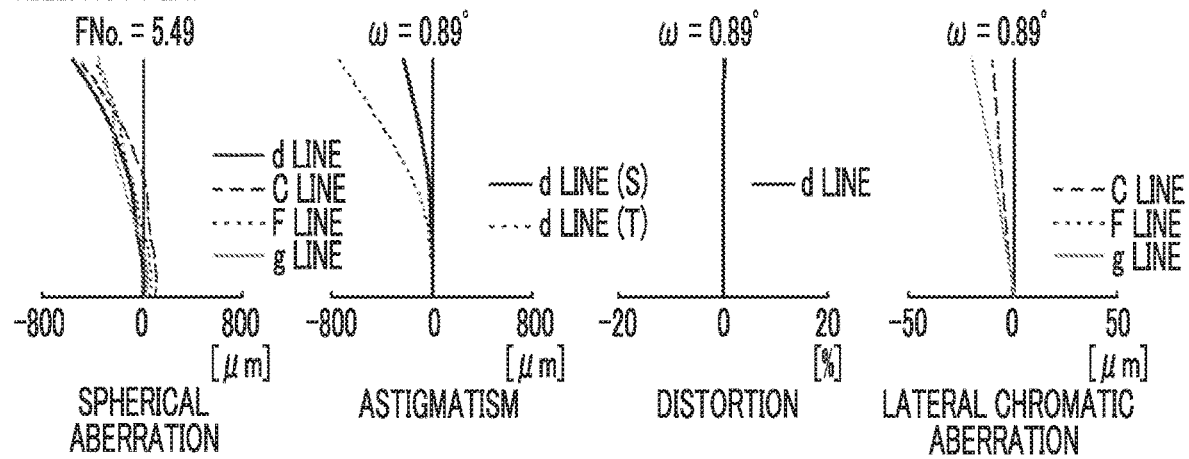

Next, a zoom lens of Example 2 will be described. FIG. 2 is a cross-sectional view illustrating a lens configuration of the zoom lens of Example 2. The group configuration of the zoom lens of Example 2 is the same as the zoom lens of Example 1. Table 5 shows basic lens data of the zoom lens of Example 2, Table 6 shows data about specification, Table 7 shows data about surface distances which are variable. Table 8 shows data about aspheric coefficients thereof, and FIG. 7 shows aberration diagrams.

TABLE 5

Example 2•Lens Data (n and ν are Based on d Line)

| Surface Number | Radius of Curvature | Surface Spacing | n | ν | θ g, f |
|---|---|---|---|---|---|
| *1 | −145.94682 | 1.178 | 1.720467 | 34.71 | 0.5835 |
| 2 | 141.36897 | 0.354 | | | |
| *3 | 143.98630 | 12.500 | 1.433871 | 95.18 | 0.5373 |
| 4 | −114.37606 | DD[4] | | | |

TABLE 5-continued

Example 2•Lens Data (n and ν are Based on d Line)

| Surface Number | Radius of Curvature | Surface Spacing | n | ν | θ g, f |
|---|---|---|---|---|---|
| 5 | 149.23003 | 7.933 | 1.433871 | 95.18 | 0.5373 |
| 6 | −230.22694 | 0.101 | | | |
| 7 | 95.14500 | 7.981 | 1.433871 | 95.18 | 0.5373 |
| 8 | −962.53095 | DD[8] | | | |
| 9 | 61.19503 | 5.038 | 1.697002 | 48.52 | 0.5589 |
| 10 | 119.28764 | DD[10] | | | |
| *11 | 80.44312 | 0.701 | 2.001003 | 29.13 | 0.5995 |
| 12 | 15.40166 | 4.283 | | | |
| 13 | −125.30403 | 0.701 | 1.900433 | 37.37 | 0.5772 |
| 14 | 50.70505 | 0.710 | | | |
| 15 | 160.98320 | 5.569 | 1.892860 | 20.36 | 0.6394 |
| 16 | −13.30012 | 0.710 | 1.882997 | 40.76 | 0.5668 |
| 17 | 118.72167 | DD[17] | | | |
| 18 | 28.55007 | 3.118 | 1.539956 | 59.46 | 0.5442 |
| 19 | −75.36503 | 0.701 | 1.882997 | 40.76 | 0.5668 |
| 20 | 173.50403 | DD[20] | | | |
| 21(Stop) | ∞ | 2.500 | | | |
| 22 | −32.19095 | 0.711 | 1.910823 | 35.25 | 0.5822 |
| 23 | 50.92641 | 2.327 | 1.945945 | 17.98 | 0.6546 |
| 24 | −217.67334 | DD[24] | | | |
| *25 | 53.99350 | 6.799 | 1.666718 | 48.32 | 0.5610 |
| *26 | −64.23667 | 0.100 | | | |
| 27 | 38.55616 | 7.982 | 1.537750 | 74.70 | 0.5394 |
| 28 | −85.37278 | 0.701 | 1.882997 | 40.76 | 0.5668 |
| 29 | 33.00764 | 5.758 | 1.568832 | 56.36 | 0.5489 |
| 30 | 641.17606 | DD[30] | | | |
| 31 | 40.69420 | 6.789 | 1.516798 | 64.20 | 0.5343 |
| 32 | −63.71247 | 0.141 | | | |
| 33 | 68.07991 | 0.701 | 1.882997 | 40.76 | 0.5668 |
| 34 | 19.21065 | 10.657 | 1.572501 | 57.74 | 0.5457 |
| 35 | −21.96187 | 0.700 | 1.882997 | 40.76 | 0.5668 |
| 36 | −144.02761 | DD[36] | | | |
| 37 | 213.94814 | 2.025 | 1.437001 | 95.10 | 0.5336 |
| 38 | −116.70484 | DD[38] | | | |
| 39 | ∞ | 33.000 | 1.608589 | 46.44 | 0.5666 |
| 40 | ∞ | 13.200 | 1.516329 | 64.05 | 0.5346 |
| 41 | ∞ | | | | |

TABLE 6

Example 2•Specification (d Line)

| | Wide-Angle End | Middle | Telephoto End |
|---|---|---|---|
| Zoom Magnification | 1.00 | 4.05 | 44.60 |
| f | 7.881 | 31.920 | 351.511 |
| Bf | 40.159 | 41.220 | 40.324 |
| FNo. | 1.85 | 1.85 | 5.49 |
| 2ω [°] | 75.00 | 19.04 | 1.78 |

TABLE 7

Example 2·Variable Surface Distance

|  | Wide-Angle End | Middle | Telephoto End |
|---|---|---|---|
| DD[4] | 7.897 | 7.897 | 7.897 |
| DD[8] | 0.201 | 0.201 | 0.201 |
| DD[10] | 0.500 | 33.674 | 55.554 |
| DD[17] | 1.246 | 1.625 | 0.417 |
| DD[20] | 52.364 | 4.007 | 0.501 |
| DD[24] | 16.670 | 22.821 | 0.501 |
| DD[30] | 13.237 | 18.456 | 0.501 |
| DD[36] | 0.501 | 2.874 | 26.880 |
| DD[38] | 5.801 | 6.862 | 5.966 |

TABLE 8

Example 2·Aspheric Coefficient

| | Surface Number | | |
|---|---|---|---|
| | 1 | 3 | 11 |
| KA | 1.0000000E+00 | 1.0000000E+00 | 1.0000000E+00 |
| A3 | 0.0000000E+00 | −2.4970998E−20 | 0.0000000E+00 |
| A4 | 3.6539294E−08 | −1.2721730E−07 | 8.8698616E−07 |
| A5 | 7.6766300E−09 | −1.0991393E−08 | −1.1607106E−06 |
| A6 | −4.4846802E−10 | 1.4406414E−09 | 3.5532320E−07 |
| A7 | 2.7580547E−11 | −1.7042207E−10 | −3.2996031E−08 |
| A8 | −4.3382090E−13 | 8.9334308E−12 | −3.3417406E−09 |
| A9 | −7.4007416E−14 | −3.6262517E−14 | 7.2516545E−10 |
| A10 | 2.1512956E−15 | −1.0512798E−14 | −8.6382973E−12 |
| A11 | 6.6974934E−17 | 2.3413200E−16 | −4.4205134E−12 |
| A12 | −2.2868490E−18 | 3.1087370E−18 | 1.5426093E−13 |
| A13 | −2.5944245E−20 | −1.4321309E−19 | 1.1441949E−14 |
| A14 | 9.9678581E−22 | 5.0409260E−22 | −4.9272363E−16 |
| A15 | 3.6427998E−24 | 2.5326465E−23 | −1.0918585E−17 |
| A16 | −1.5812056E−25 | −2.4405220E−25 | 4.8993741E−19 |

| | Surface Number | |
|---|---|---|
| | 25 | 26 |
| KA | 1.0000000E+00 | 1.0000000E+00 |
| A4 | −1.1859297E−06 | 2.6367998E−06 |
| A6 | 9.2385941E−10 | 7.5189466E−10 |
| A8 | 9.6138036E−13 | −8.7232853E−14 |
| A10 | 4.2083965E−15 | 6.6546398E−15 |

Figure 3:
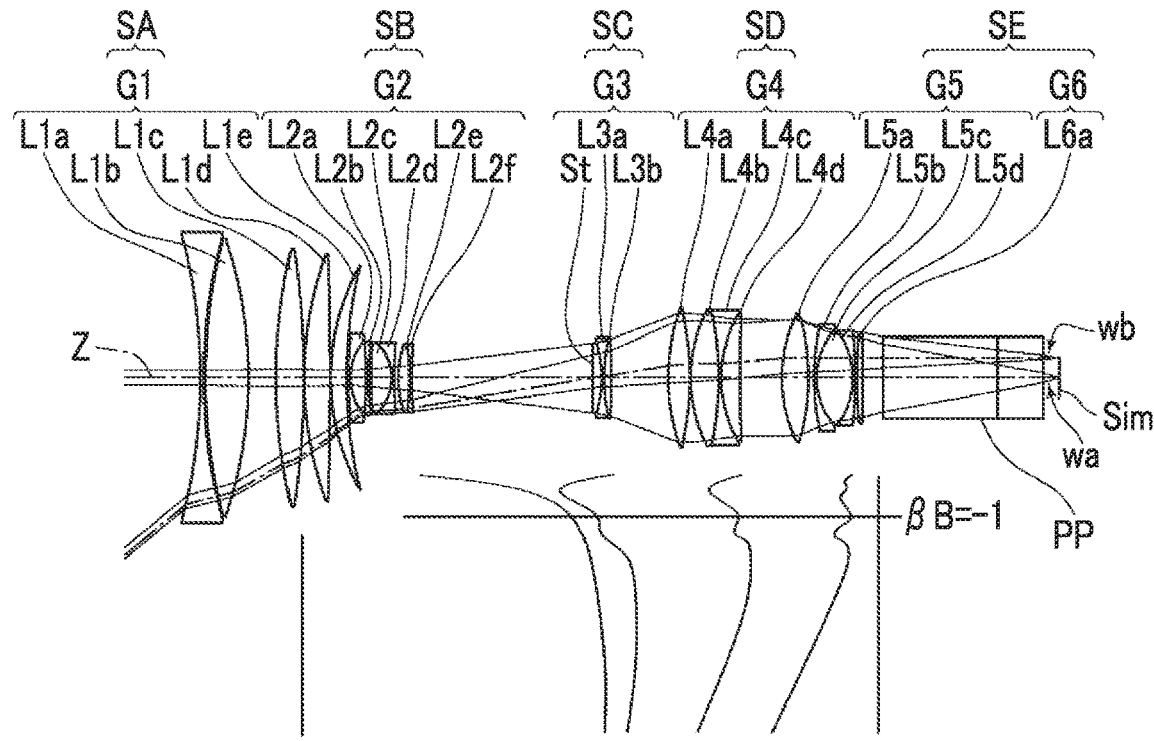
FIG. 3 is a cross-sectional view illustrating a lens configuration of a zoom lens of Example 3 of the present invention.
Figure 3:
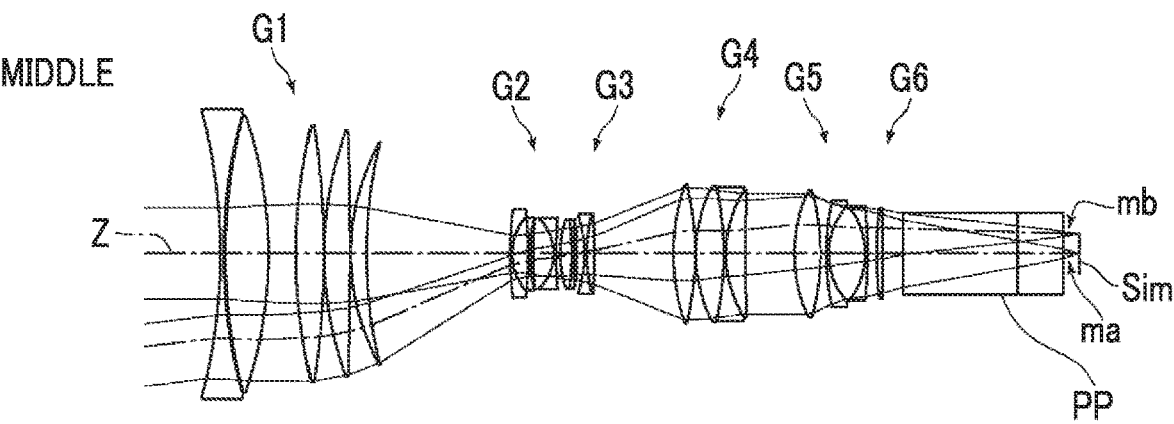
Figure 3:
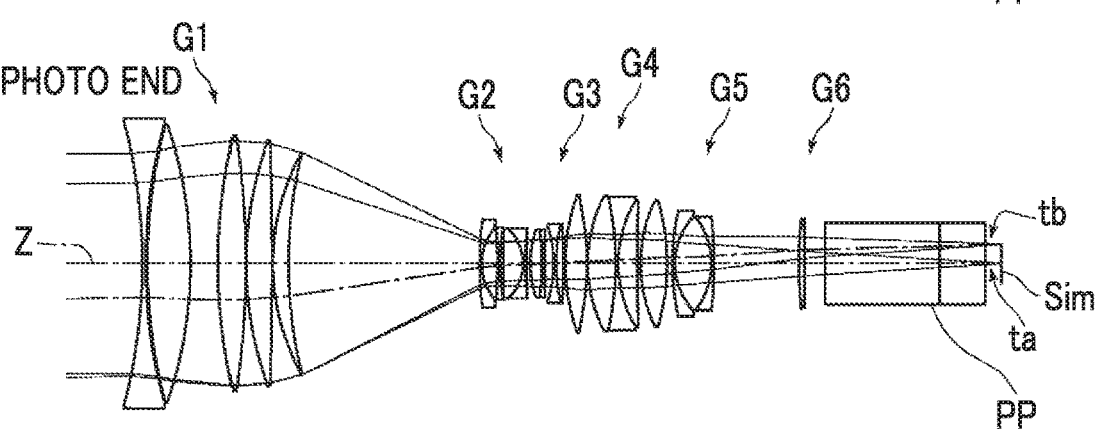

Next, a zoom lens of Example 3 will be described. FIG. 3 is a cross-sectional view illustrating a lens configuration of the zoom lens of Example 3.

The zoom lens of Example 3 is composed of, in order from the object side, a first lens group G1 composed of five lenses L1a to L1e, a second lens group G2 composed of six lenses L2a to L2f, a third lens group G3 composed of an aperture stop St and two lenses L3a and L3b, a fourth lens group G4 composed of four lenses L4a to L4d, a fifth lens group G5 composed of four lenses L5a to L5d, and a sixth lens group G6 composed of one lens L6a.

The A constituent section SA is composed of only the first lens group G1, the B constituent section SB is composed of only the second lens group G2, the C constituent section SC is composed of only the third lens group G3, the D constituent section SD is composed of only the fourth lens group G4, and the E constituent section SE is composed of the fifth lens group G5 and the sixth lens group G6.

Figure 8:
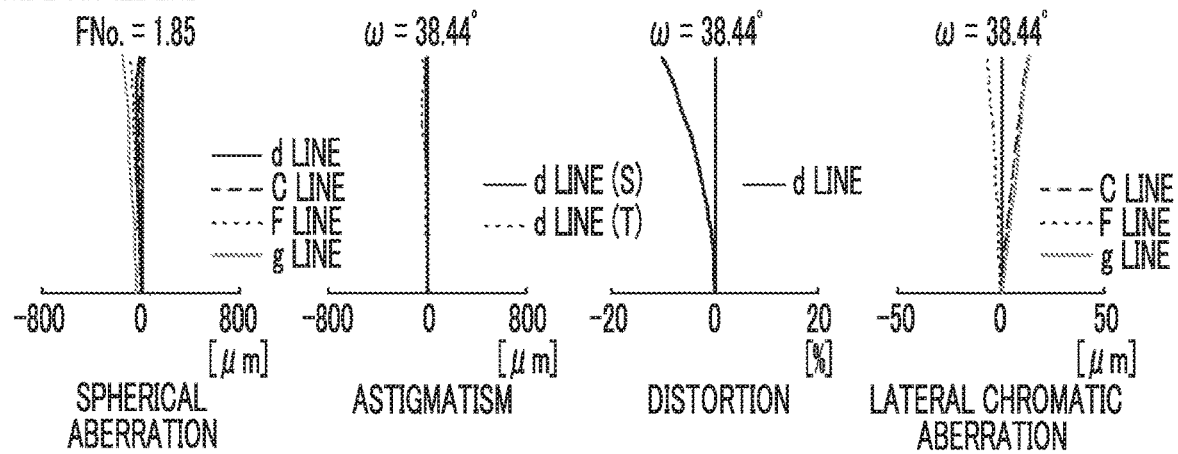
FIG. 8 is a diagram of aberrations of the zoom lens of Example 3 of the present invention.
Figure 8:
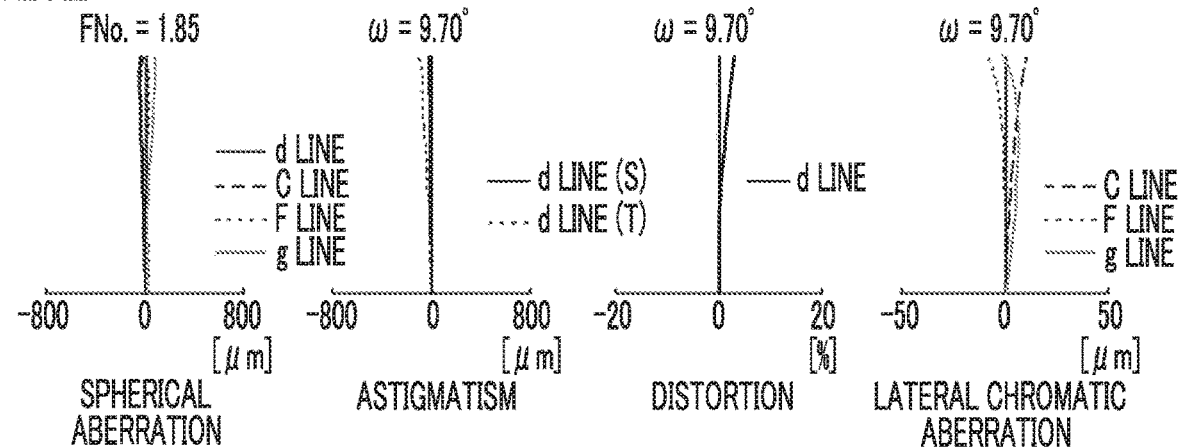
Figure 8:
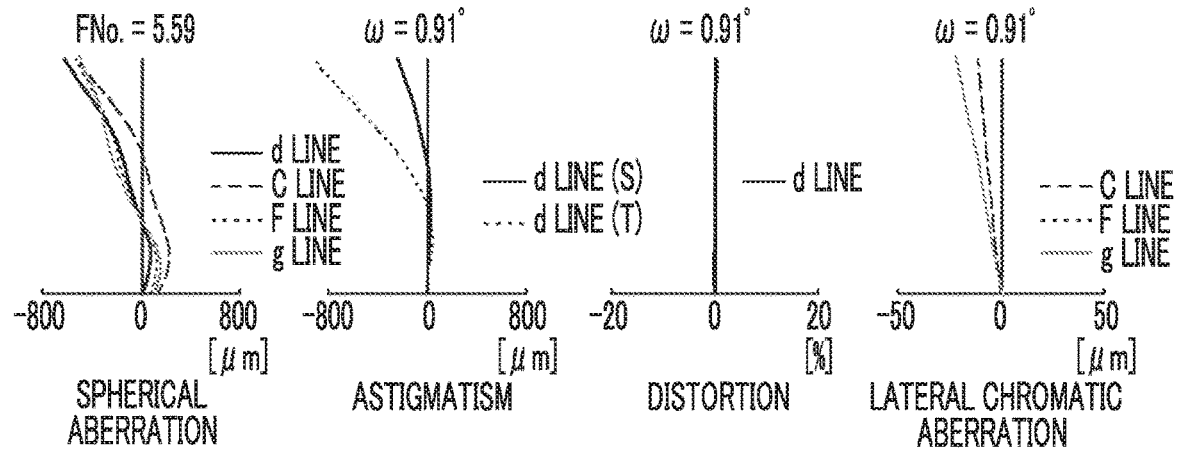

Table 9 shows basic lens data of the zoom lens of Example 3, Table 10 shows data about specification, Table 11 shows data about surface distances which are variable, Table 12 shows data about aspheric coefficients thereof, and FIG. 8 shows aberration diagrams.

TABLE 9

Example 3·Lens Data (n and ν are Based on d Line)

| Surface Number | Radius of Curvature | Surface Spacing | n | ν | θ g, f |
|---|---|---|---|---|---|
| *1 | −147.78020 | 0.999 | 1.720467 | 34.71 | 0.5835 |
| 2 | 142.68010 | 0.541 | | | |
| *3 | 146.12213 | 12.498 | 1.433871 | 95.18 | 0.5373 |
| 4 | −114.81355 | DD [4] | | | |
| 5 | 151.78338 | 7.801 | 1.433871 | 95.18 | 0.5373 |
| 6 | −229.50945 | 0.100 | | | |
| 7 | 96.10461 | 7.545 | 1.433871 | 95.18 | 0.5373 |
| 8 | −994.43644 | DD [8] | | | |
| 9 | 61.71870 | 4.506 | 1.719995 | 50.23 | 0.5521 |
| 10 | 121.37553 | DD [10] | | | |
| *11 | 82.31234 | 0.700 | 2.001003 | 29.13 | 0.5995 |
| 12 | 15.32362 | 4.521 | | | |
| 13 | −122.65155 | 0.699 | 1.910823 | 35.25 | 0.5822 |
| 14 | 50.22885 | 0.907 | | | |
| 15 | 165.45916 | 5.852 | 1.892860 | 20.36 | 0.6394 |
| 16 | −13.10393 | 0.711 | 1.882997 | 40.76 | 0.5668 |
| 17 | 117.83046 | 1.237 | | | |
| 18 | 28.17743 | 3.261 | 1.563840 | 60.83 | 0.5408 |
| 19 | −75.22980 | 0.701 | 1.891900 | 37.13 | 0.5781 |
| 20 | 174.26193 | DD [20] | | | |
| 21 (Stop) | ∞ | 2.499 | | | |
| 22 | −31.45084 | 0.709 | 1.891900 | 37.13 | 0.5781 |
| 23 | 43.35043 | 2.158 | 1.922860 | 18.90 | 0.6496 |
| 24 | −229.65218 | DD [24] | | | |
| *25 | 55.54359 | 6.373 | 1.699998 | 48.08 | 0.5596 |
| *26 | −67.16304 | 0.101 | | | |
| 27 | 38.98461 | 8.185 | 1.537750 | 74.70 | 0.5394 |
| 28 | −83.52611 | 0.701 | 1.882997 | 40.76 | 0.5668 |
| 29 | 32.88600 | 5.552 | 1.516798 | 64.20 | 0.5343 |
| 30 | 508.69518 | DD [30] | | | |
| 31 | 38.86747 | 7.655 | 1.516798 | 64.20 | 0.5343 |
| 32 | −61.04966 | 1.690 | | | |
| 33 | 67.77318 | 0.698 | 1.882997 | 40.76 | 0.5668 |
| 34 | 19.08777 | 10.520 | 1.572501 | 57.74 | 0.5457 |
| 35 | −20.84935 | 0.699 | 1.851500 | 40.78 | 0.5696 |
| 36 | −133.02750 | DD [36] | | | |
| 37 | 102.92716 | 1.771 | 1.437001 | 95.10 | 0.5336 |
| 38 | −348.07297 | 5.800 | | | |
| 39 | ∞ | 33.000 | 1.608589 | 46.44 | 0.5666 |
| 40 | ∞ | 13.200 | 1.516329 | 64.05 | 0.5346 |
| 41 | ∞ | | | | |

TABLE 10

Example 3·Specification (d Line)

| | Wide-Angle End | Middle | Telephoto End |
|---|---|---|---|
| Zoom Magnification | 1.00 | 4.05 | 44.60 |
| f | 7.708 | 31.216 | 343.763 |
| Bf | 39.572 | 39.572 | 39.572 |
| FNo. | 1.85 | 1.85 | 5.59 |
| 2ω [°] | 76.88 | 19.40 | 1.82 |

TABLE 11

Example 3·Variable Surface Distance

| | Wide-Angle End | Middle | Telephoto End |
|---|---|---|---|
| DD [4] | 7.844 | 7.844 | 7.844 |
| DD [8] | 0.201 | 0.201 | 0.201 |
| DD [10] | 0.500 | 33.884 | 55.611 |
| DD [20] | 52.478 | 3.666 | 0.323 |
| DD [24] | 16.556 | 22.900 | 0.500 |
| DD [30] | 12.186 | 17.874 | 1.012 |
| DD [36] | 0.501 | 3.897 | 24.775 |

TABLE 12

Example 3·Aspheric Coefficient

| | Surface Number | | |
|---|---|---|---|
| | 1 | 3 | 11 |
| KA | 1.0000000E+00 | 1.0000000E+00 | 1.0000000E+00 |
| A3 | 0.0000000E+00 | 2.5827682E−20 | 2.3758859E−20 |
| A4 | 3.7058698E−07 | −6.9860208E−07 | −3.3336819E−06 |
| A5 | −1.8884281E−08 | 3.7961507E−08 | 1.4126902E−06 |
| A6 | −4.8230436E−10 | 1.2154664E−09 | −2.6714457E−07 |
| A7 | 1.0334788E−10 | −3.0106945E−10 | 1.5171453E−08 |
| A8 | −1.9670041E−12 | 1.2626990E−11 | 9.9837757E−10 |
| A9 | −1.7111326E−13 | 9.1318330E−14 | −9.6261155E−11 |
| A10 | 5.0067901E−15 | −1.6111513E−14 | −3.7804894E−12 |
| A11 | 1.3034037E−16 | 1.8644962E−16 | 2.3312880E−13 |
| A12 | −4.5372292E−18 | 6.6378479E−18 | 1.5616713E−14 |
| A13 | −4.6645387E−20 | −1.4213404E−19 | −2.2938266E−16 |
| A14 | 1.8403038E−21 | −4.6887665E−22 | −3.2095688E−17 |
| A15 | 6.3445883E−24 | 2.7172422E−23 | 4.2792985E−20 |
| A16 | −2.8180379E−25 | −1.5065309E−25 | 2.2165404E−20 |

| | Surface Number | |
|---|---|---|
| | 25 | 26 |
| KA | 1.0000000E+00 | 1.0000000E+00 |
| A4 | −7.0092154E−07 | 2.9081770E−06 |
| A6 | 1.5200564E−10 | 5.9802474E−10 |
| A8 | 1.9333653E−12 | −4.3096701E−13 |
| A10 | 5.1218957E−15 | 9.2694517E−15 |

Figure 4:
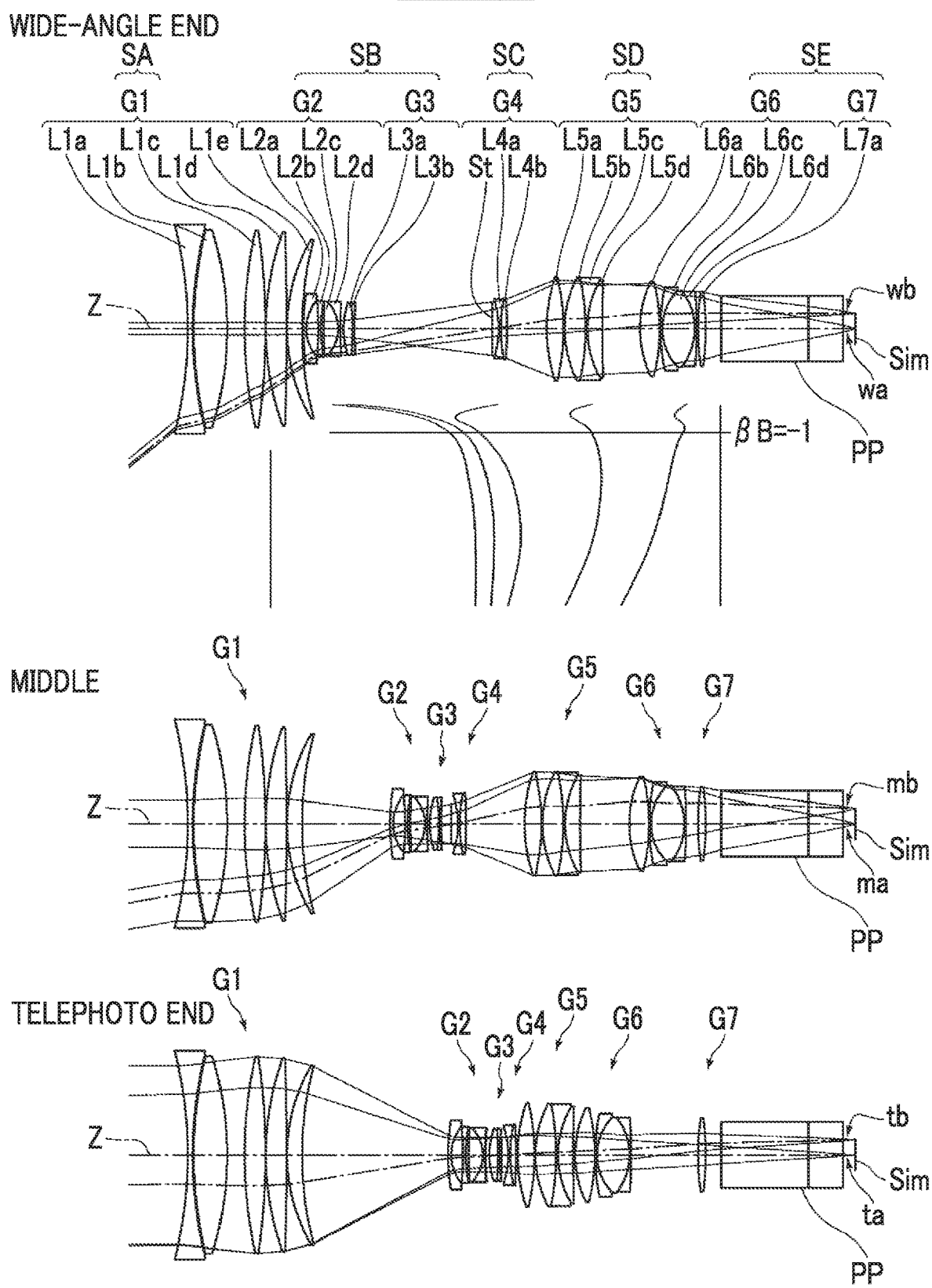
FIG. 4 is a cross-sectional view illustrating a lens configuration of a zoom lens of Example 4 of the present invention.
Figure 9:
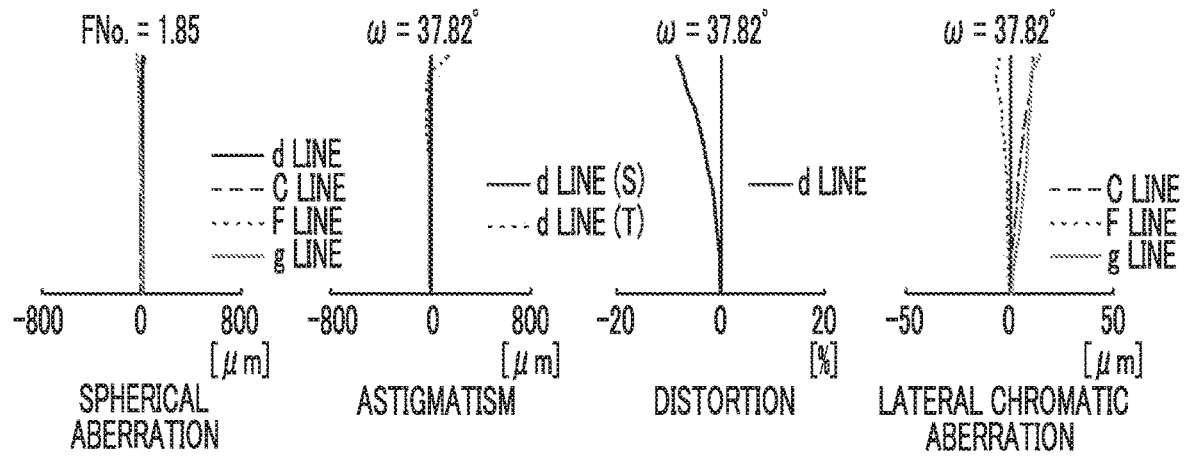
FIG. 9 is a diagram of aberrations of the zoom lens of Example 4 of the present invention.
Figure 9:
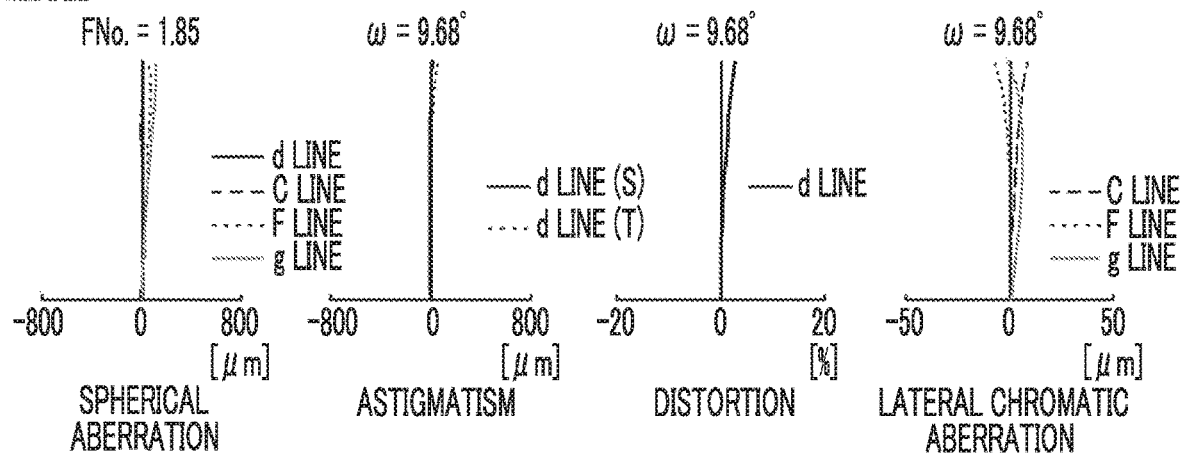
Figure 9:
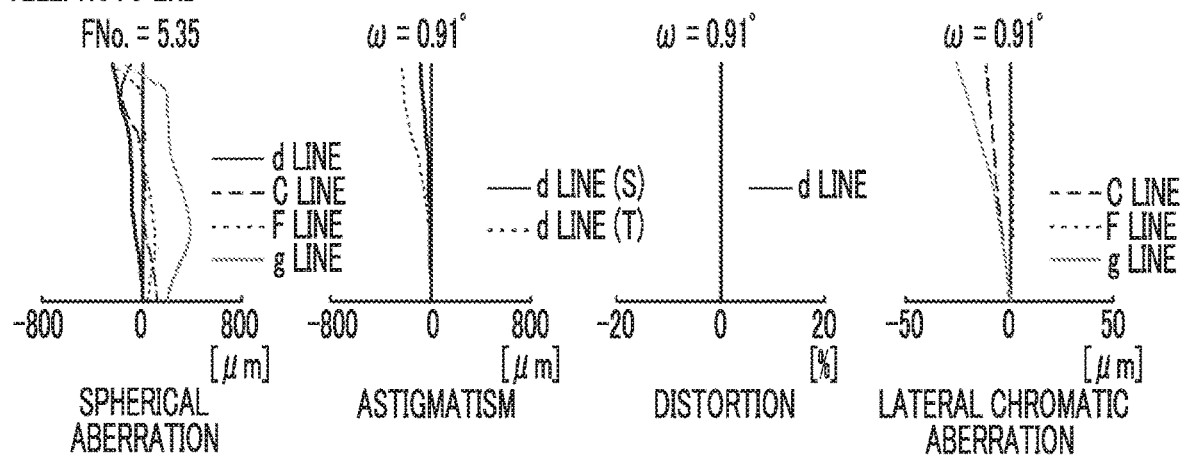

Next, a zoom lens of Example 4 will be described. FIG. 4 is a cross-sectional view illustrating a lens configuration of the zoom lens of Example 4. The group configuration of the zoom lens of Example 4 is the same as the zoom lens of Example 1. Table 13 shows basic lens data of the zoom lens of Example 4, Table 14 shows data about specification, Table 15 shows data about surface distances which are variable, Table 16 shows data about aspheric coefficients thereof, Table 17 shows data about diffractive optical surface coefficients, and FIG. 9 shows aberration diagrams.

The data about the diffractive optical surface coefficients in Table 17 shows the surface numbers of the diffractive optical surfaces and the diffractive optical surface coefficients of the diffractive optical surfaces. The "E±n" (n: an integer) in numerical values of the diffractive optical surface coefficients of Table 9 indicates "×10$^{±n}$". The diffractive optical surface applied to each lens is represented by a macroscopic lens shape as a basic shape and an optical path difference function Φ(h) where the addition amount of the optical path length which should be set for the diffractive optical surface is represented by a function of the height h from the optical axis Z. The diffractive optical surface coefficient is a value of each coefficient Pk in the optical path difference function Φ(h) represented by the following expression.

$$\Phi(h) = \lambda/(2\pi) \times \Sigma Pk \cdot h^k$$

Here, Φ(h) is an optical path difference function (an amount of addition to the optical path length of the diffractive optical surface), λ is a wavelength, Pk is a diffractive optical surface coefficient, h is a height (a distance from the optical axis to the lens surface), and Σ in the optical path difference function Φ(h) means a sum with respect to k.

TABLE 13

Example 4·Lens Data (n and ν are Based on d Line)

| Surface Number | Radius of Curvature | Surface Spacing | n | ν | θ g, f |
|---|---|---|---|---|---|
| *1 | −147.45814 | 1.895 | 1.720467 | 34.71 | 0.5835 |
| 2 | 145.90415 | 0.365 | | | |
| *3 | 146.71736 | 12.468 | 1.433871 | 95.18 | 0.5373 |
| 4 | −119.42278 | 6.566 | | | |
| 5 | 154.70320 | 7.937 | 1.433871 | 95.18 | 0.5373 |
| 6 | −232.01918 | 0.103 | | | |
| *7 | 99.43426 | 7.933 | 1.433871 | 95.18 | 0.5373 |
| 8 | −921.67775 | 0.100 | | | |
| 9 | 62.31812 | 5.641 | 1.768503 | 48.88 | 0.5532 |
| 10 | 118.96139 | DD [10] | | | |
| *11 | 78.82396 | 1.150 | 2.001003 | 29.13 | 0.5995 |
| 12 | 15.38328 | 4.493 | | | |
| 13 | −123.25773 | 1.034 | 1.913967 | 37.71 | 0.5754 |
| 14 | 50.38372 | 1.029 | | | |
| 15 | 166.50111 | 5.490 | 1.884287 | 20.60 | 0.6386 |
| 16 | −13.63520 | 0.773 | 1.872233 | 40.78 | 0.5665 |
| 17 | 117.43698 | DD [17] | | | |
| 18 | 28.34937 | 3.414 | 1.507961 | 53.51 | 0.5529 |
| 19 | −76.07414 | 0.729 | 1.882989 | 39.68 | 0.5691 |
| 20 | 173.31343 | DD [20] | | | |
| 21 (Stop) | ∞ | 2.502 | | | |
| 22 | −31.33981 | 0.711 | 1.885795 | 40.49 | 0.5676 |
| 23 | 48.49579 | 2.346 | 1.898111 | 20.13 | 0.6411 |
| 24 | −229.70177 | DD [24] | | | |
| *25 | 55.18577 | 6.378 | 1.683174 | 48.79 | 0.5599 |
| *26 | −68.89702 | 0.363 | | | |
| 27 | 38.84662 | 7.877 | 1.564181 | 72.50 | 0.5426 |
| 28 | −86.31009 | 0.700 | 1.882990 | 39.70 | 0.5691 |
| 29 | 34.31465 | 5.685 | 1.558849 | 47.09 | 0.5648 |
| 30 | 552.43991 | DD [30] | | | |
| 31 | 38.38783 | 7.447 | 1.490020 | 65.38 | 0.5351 |
| 32 | −66.14517 | 0.101 | | | |
| 33 | 69.41644 | 0.701 | 1.882994 | 39.70 | 0.5691 |
| 34 | 19.16806 | 12.312 | 1.563277 | 56.07 | 0.5511 |
| 35 | −21.22404 | 0.700 | 1.871396 | 39.15 | 0.5715 |
| 36 | −165.72781 | DD [36] | | | |
| 37 | 91.15809 | 2.916 | 1.475517 | 86.44 | 0.5370 |
| 38 | −98.25427 | 5.800 | | | |
| 39 | ∞ | 33.000 | 1.608589 | 46.44 | 0.5666 |
| 40 | ∞ | 13.200 | 1.516329 | 64.05 | 0.5346 |
| 41 | ∞ | | | | |

TABLE 14

Example 4·Specification (d Line)

| | Wide-Angle End | Middle | Telephoto End |
|---|---|---|---|
| Zoom Magnification | 1.00 | 4.05 | 44.60 |
| f | 7.739 | 31.344 | 345.174 |
| Bf | 39.527 | 39.527 | 39.527 |
| FNo. | 1.85 | 1.85 | 5.35 |
| 2ω [°] | 75.64 | 19.36 | 1.82 |

TABLE 15

Example 4·Variable Surface Distance

| | Wide-Angle End | Middle | Telephoto End |
|---|---|---|---|
| DD [10] | 0.501 | 33.310 | 55.061 |
| DD [17] | 1.244 | 1.027 | 1.313 |
| DD [20] | 51.577 | 3.780 | 0.522 |
| DD [24] | 15.064 | 21.902 | 0.505 |
| DD [30] | 14.261 | 18.606 | 0.754 |
| DD [36] | 0.501 | 4.523 | 24.993 |

TABLE 16

Example 4•Aspheric Coefficient

| | Surface Number | | |
|---|---|---|---|
| | 1 | 3 | 11 |
| KA | 1.0000000E+00 | 1.0000000E+00 | 1.0000000E+00 |
| A4 | −7.9454768E−07 | 1.3935646E−06 | 3.0143598E−06 |
| A6 | 4.3195514E−09 | −7.2711763E−09 | −1.1861856E−07 |
| A8 | −1.2951752E−11 | 2.1062675E−11 | 3.8466171E−09 |
| A10 | 2.5681511E−14 | −4.1169472E−14 | −8.9398862E−11 |
| A12 | −3.3955078E−17 | 5.4205103E−17 | 1.4061795E−12 |
| A14 | 2.9257456E−20 | −4.6817455E−20 | −1.4254280E−14 |
| A16 | −1.5704289E−23 | 2.5340227E−23 | 8.7893132E−17 |
| A18 | 4.7578302E−27 | −7.7886290E−27 | −2.9811952E−19 |
| A20 | −6.2076526E−31 | 1.0374802E−30 | 4.2524764E−22 |

| | Surface Number | | |
|---|---|---|---|
| | 7 | 25 | 26 |
| KA | 1.0000000E+00 | 1.0000000E+00 | 1.0000000E+00 |
| A4 | −1.1962110E−07 | −1.0055307E−06 | 2.7686733E−06 |
| A6 | 1.7970909E−10 | −1.0631496E−09 | −1.2541310E−09 |
| A8 | −1.1148439E−13 | 5.6435458E−12 | 4.0336682E−12 |
| A10 | 2.6821894E−17 | −3.7602667E−16 | 2.9167737E−15 |

TABLE 17

Example 4•Diffractive Optical Surface Coefficient

| | Surface Number 7 |
|---|---|
| P2 | −4.1452233E−02 |
| P4 | 7.9344160E−05 |
| P6 | −1.3350903E−07 |
| P8 | 4.6186892E−11 |
| P10 | 6.9030948E−15 |

Figure 5:
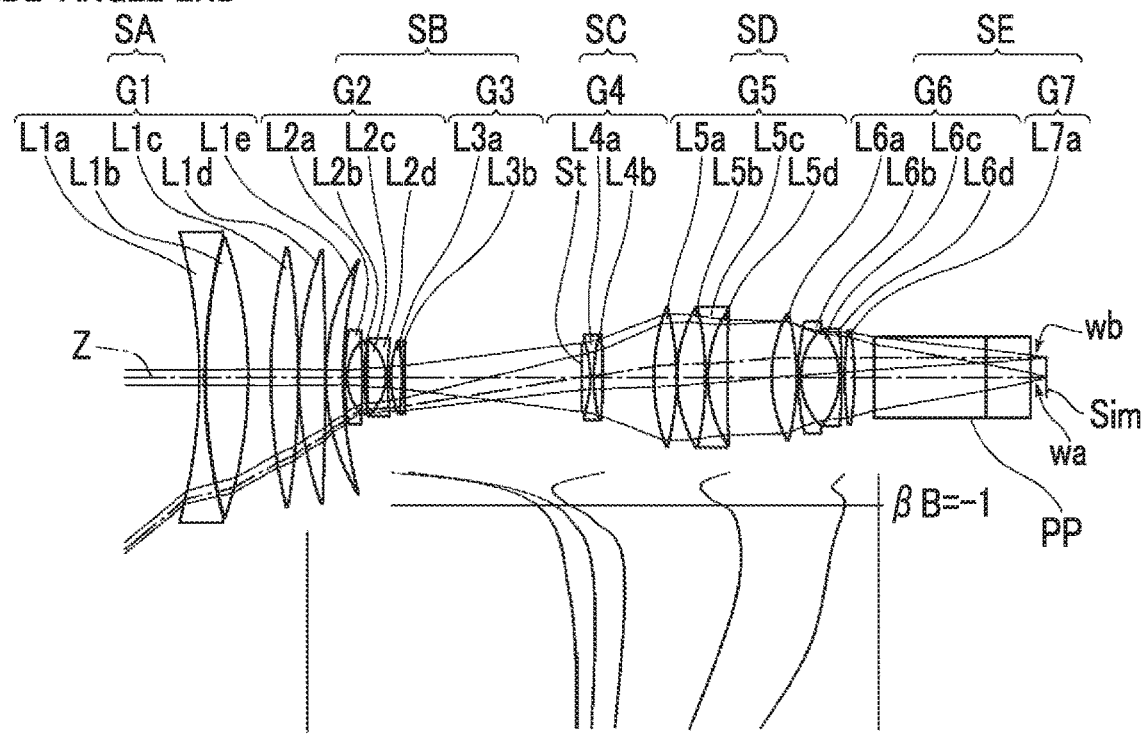
FIG. 5 is a cross-sectional view illustrating a lens configuration of a zoom lens of Example 5 of the present invention.
Figure 5:
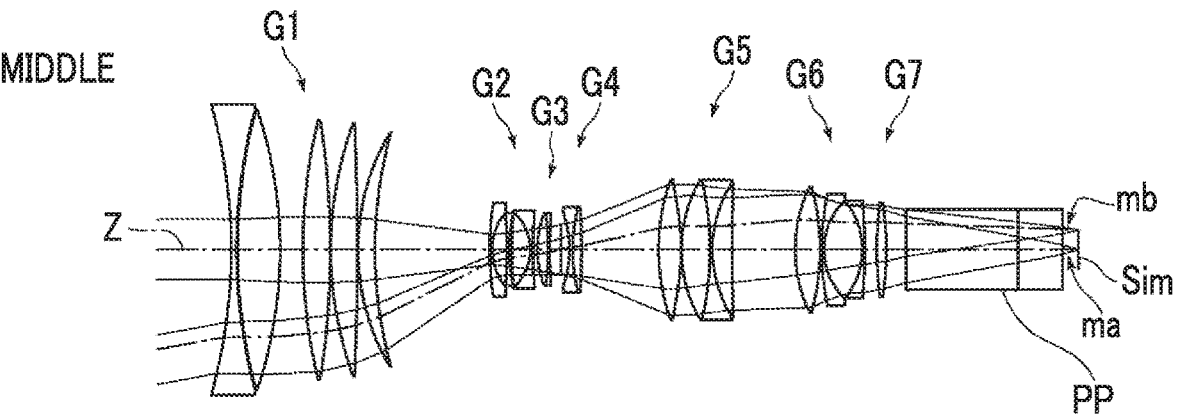
Figure 5:
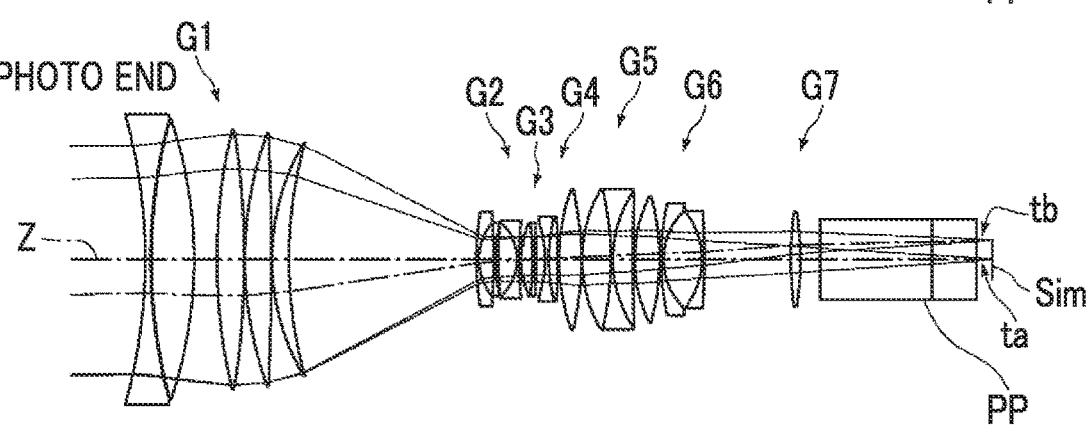
Figure 10:
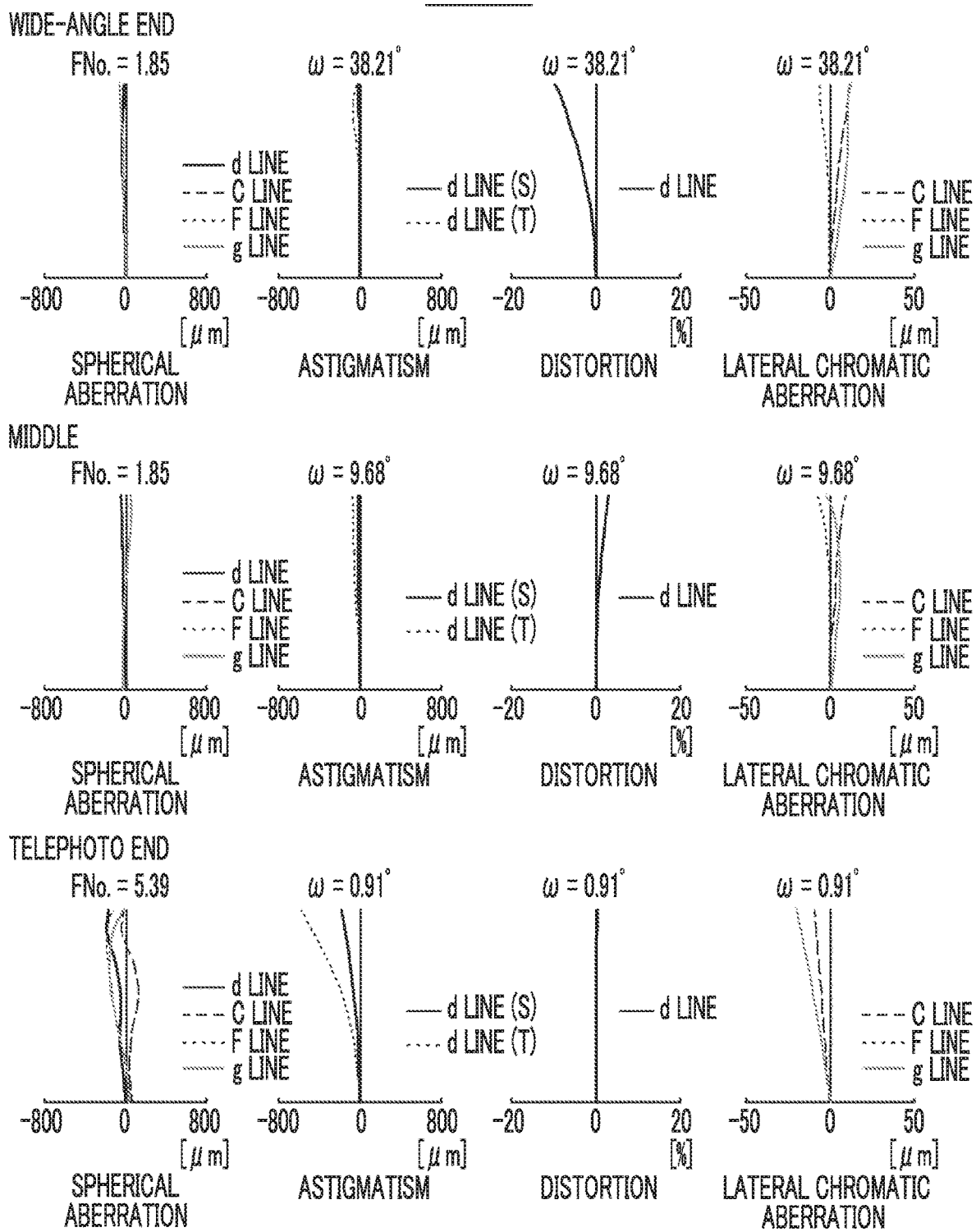
FIG. 10 is a diagram of aberrations of the zoom lens of Example 5 of the present invention.

Next, a zoom lens of Example 5 will be described. FIG. 5 is a cross-sectional view illustrating a lens configuration of the zoom lens of Example 5. The group configuration of the zoom lens of Example 5 is the same as the zoom lens of Example 1. Table 18 shows basic lens data of the zoom lens of Example 5, Table 19 shows data about specification. Table 20 shows data about surface distances which are variable, Table 21 shows data about aspheric coefficients thereof, Table 22 shows data about diffractive optical surface coefficients, and FIG. 10 shows aberration diagrams.

TABLE 18

Example 5•Lens Data (n and ν are Based on d Line)

| Surface Number | Radius of Curvature | Surface Spacing | n | ν | θ g, f |
|---|---|---|---|---|---|
| *1 | −147.44399 | 1.536 | 1.720467 | 34.71 | 0.5835 |
| 2 | 145.63119 | 0.280 | | | |
| *3 | 148.43331 | 12.499 | 1.433871 | 95.18 | 0.5373 |
| 4 | −118.56868 | DD [4] | | | |
| 5 | 153.94190 | 8.079 | 1.433871 | 95.18 | 0.5373 |
| 6 | −226.33062 | 0.101 | | | |
| *7 | 99.43768 | 7.782 | 1.433871 | 95.18 | 0.5373 |
| 8 | −857.23397 | DD [8] | | | |
| 9 | 62.51546 | 5.051 | 1.772499 | 49.60 | 0.5521 |
| 10 | 120.74359 | DD [10] | | | |
| *11 | 80.57103 | 0.701 | 2.001003 | 29.13 | 0.5995 |
| 12 | 15.35159 | 4.408 | | | |
| 13 | −125.13141 | 0.701 | 1.882997 | 40.76 | 0.5668 |
| 14 | 50.58270 | 0.765 | | | |
| 15 | 192.62075 | 5.383 | 1.892860 | 20.36 | 0.6394 |
| 16 | −13.73377 | 0.711 | 1.882997 | 40.76 | 0.5668 |

TABLE 18-continued

Example 5•Lens Data (n and ν are Based on d Line)

| Surface Number | Radius of Curvature | Surface Spacing | n | ν | θ g, f |
|---|---|---|---|---|---|
| 17 | 118.79945 | DD [17] | | | |
| 18 | 28.51551 | 3.108 | 1.517417 | 52.43 | 0.5565 |
| 19 | −75.95383 | 0.699 | 1.882997 | 40.76 | 0.5668 |
| 20 | 174.10076 | DD [20] | | | |
| 21 (Stop) | ∞ | 2.501 | | | |
| 22 | −31.49432 | 1.100 | 1.882997 | 40.76 | 0.5668 |
| 23 | 48.50869 | 2.534 | 1.892860 | 20.36 | 0.6394 |
| 24 | −224.88280 | DD [24] | | | |
| *25 | 55.63782 | 6.632 | 1.670029 | 47.23 | 0.5628 |
| *26 | −67.53595 | 0.101 | | | |
| 27 | 38.52336 | 8.354 | 1.550323 | 75.50 | 0.5400 |
| 28 | −83.86478 | 0.700 | 1.882997 | 40.76 | 0.5668 |
| 29 | 34.00392 | 5.780 | 1.568832 | 56.36 | 0.5489 |
| 30 | 623.27362 | DD [30] | | | |
| 31 | 38.81239 | 7.293 | 1.516798 | 64.20 | 0.5343 |
| 32 | −65.72867 | 0.469 | | | |
| 33 | 69.51080 | 0.754 | 1.882997 | 40.76 | 0.5668 |
| 34 | 18.78288 | 11.241 | 1.568832 | 56.36 | 0.5489 |
| 35 | −21.17956 | 0.701 | 1.882997 | 40.76 | 0.5668 |
| 36 | −166.83980 | DD [36] | | | |
| 37 | 102.99520 | 2.750 | 1.437001 | 95.10 | 0.5336 |
| 38 | −88.86008 | 5.800 | | | |
| 39 | ∞ | 33.000 | 1.608589 | 46.44 | 0.5666 |
| 40 | ∞ | 13.200 | 1.516329 | 64.05 | 0.5346 |
| 41 | ∞ | 4.706 | | | |

TABLE 19

Example 5•Specification (d Line)

| | Wide-Angle End | Middle | Telephoto End |
|---|---|---|---|
| Zoom Magnification | 1.00 | 4.05 | 44.60 |
| f | 7.728 | 31.298 | 344.660 |
| Bf | 39.726 | 39.726 | 39.726 |
| FNo. | 1.85 | 1.85 | 5.39 |
| 2ω [°] | 76.42 | 19.36 | 1.82 |

TABLE 20

Example 5 Variable Surface Distance

| | Wide-Angle End | Middle | Telephoto End |
|---|---|---|---|
| DD [4] | 6.687 | 6.687 | 6.687 |
| DD [8] | 0.199 | 0.199 | 0.199 |
| DD [10] | 0.499 | 33.555 | 55.073 |
| DD [17] | 0.947 | 1.370 | 0.432 |
| DD [20] | 51.956 | 3.192 | 0.501 |
| DD [24] | 15.073 | 22.305 | 0.500 |
| DD [30] | 12.996 | 18.469 | 0.532 |
| DD [36] | 1.010 | 3.589 | 25.442 |

TABLE 21

Example 5•Aspheric Coefficient

| | Surface Number | | |
|---|---|---|---|
| | 1 | 3 | 11 |
| KA | 1.0000000E+00 | 1.0000000E+00 | 1.0000000E+00 |
| A3 | −4.4530602E−22 | −2.3502696E−20 | 4.9284742E−21 |
| A4 | −2.0035731E−07 | 3.5224258E−07 | 2.9861021E−06 |
| A5 | 1.0032469E−09 | −9.6590157E−09 | −8.0426004E−07 |
| A6 | 4.3003005E−10 | 6.6456133E−10 | 7.3368405E−08 |
| A7 | 1.8393555E−11 | −1.5986876E−10 | −1.0621936E−10 |

TABLE 21-continued

Example 5·Aspheric Coefficient

| A8 | −1.4419303E−12 | 8.3326627E−12 | −2.7347183E−10 |
|---|---|---|---|
| A9 | −3.3284989E−14 | −9.6645851E−15 | 2.8957460E−12 |
| A10 | 2.2778886E−15 | −9.3969820E−15 | 5.3260621E−13 |
| A11 | 2.2788730E−17 | 1.7257636E−16 | −4.5416853E−15 |
| A12 | −1.7440077E−18 | 3.0388318E−18 | −6.0660336E−16 |
| A13 | −6.6121509E−21 | −1.0524317E−19 | 2.9100711E−18 |
| A14 | 6.4153916E−22 | 1.5572279E−22 | 3.8666000E−19 |
| A15 | 6.4197712E−25 | 1.8107261E−23 | −6.9910623E−22 |
| A16 | −9.1733639E−26 | −1.4565521E−25 | −1.0650150E−22 |

| | Surface Number | | |
|---|---|---|---|
| | 7 | 25 | 26 |
| KA | 1.0000000E+00 | 1.0000000E+00 | 1.0000000E+00 |
| A4 | −2.0989270E−08 | −1.1193904E−06 | 2.5642414E−06 |
| A6 | 8.6919805E−12 | −3.7823243E−10 | −1.2722087E−10 |
| A8 | 1.7101478E−16 | 3.2683434E−12 | −1.1535143E−13 |
| A10 | −3.6066550E−18 | 6.2245572E−15 | 1.2443903E−14 |

TABLE 22

Example 5·Diffractive Optical Surface Coefficient

| | Surface Number 7 |
|---|---|
| P2 | −2.0662574E−02 |
| P4 | 2.5994441E−05 |
| P6 | −2.3276657E−08 |
| P8 | 8.7289746E−12 |
| P10 | −5.9672446E−16 |

Table 23 shows values corresponding to Conditional Expressions (1) to (7) of the zoom lenses of Examples 1 to 5. It should be noted that, in the above-mentioned examples, the d line is set as the reference wavelength, and the values shown in Table 23 are values at the reference wavelength.

TABLE 23

| Expression Number | Conditional Expression | Example 1 | Example 2 | Example 3 | Example 4 | Example 5 |
|---|---|---|---|---|---|---|
| (1) | βTB/βWB/Zr | 2.37 | 1.93 | 2.20 | 3.18 | 2.60 |
| (2) | gtT/gtW | 2.02 | 2.27 | 2.19 | 1.81 | 1.88 |
| (3) | fB/fA | −0.19 | −0.19 | −0.20 | −0.19 | −0.19 |
| (4) | fC/fB | 3.11 | 3.13 | 3.05 | 3.14 | 3.18 |
| (5) | νd | 95.17 (L1b) | 95.17 (L1b) | 95.17 (L1b) | 95.17 (L1b) | 95.17 (L1b) |
| | | 95.17 (L1c) | 95.17 (L1c) | 95.17 (L1c) | 95.17 (L1c) | 95.17 (L1c) |
| | | 95.17 (L1d) | 95.17 (L1d) | 95.17 (L1d) | 95.17 (L1d) | 95.17 (L1d) |
| (6) | θgF + 0.001625 × νd | 0.69189 (L1b) | 0.69189 (L1b) | 0.69189 (L1b) | 0.69189 (L1b) | 0.69189 (L1b) |
| | | 0.69189 (L1c) | 0.69189 (L1c) | 0.69189 (L1c) | 0.69189 (L1c) | 0.69189 (L1c) |
| | | 0.69189 (L1d) | 0.69189 (L1d) | 0.69189 (L1d) | 0.69189 (L1d) | 0.69189 (L1d) |
| (7) | fB1/fB2 | −0.11 | −0.11 | X | −0.10 | −0.10 |

As can be seen from the above data, all the zoom lenses of Examples 1 to 5 are zoom lenses each of which satisfies Conditional Expressions (1) to (7) has a favorable optical performance with a high magnification of 30 times or more while maintaining a sufficient back focal length and having a small size.

$$Bfw/fw \geq 3$$

Here, Bfw is a back focal length (air conversion length) of the whole system at the wide-angle end, and fw is a focal length of the whole system at the wide-angle end.

Next, an imaging apparatus according to an embodiment of the present invention will be described. FIG. 11 is a schematic configuration diagram of an imaging apparatus 10 using the zoom lens 1 according to the above-mentioned embodiment of the present invention as an example of an imaging apparatus of an embodiment of the present invention. Examples of the imaging apparatus 10 include a movie imaging camera, a broadcast camera, a digital camera, a video camera, a surveillance camera, and the like.

The imaging apparatus 10 comprises a zoom lens 1, a filter 2 which is disposed on the image side of the zoom lens 1, and an imaging element 3 which is disposed on the image side of the filter 2. In addition, FIG. 11 schematically shows the first to seventh lens groups G1 to G7 comprising the zoom lens 1.

The imaging element 3 captures an optical image, which is formed through the zoom lens 1, and converts the image into an electrical signal. For example, charge coupled device (CCD), complementary metal oxide semiconductor (CMOS), or the like may be used. The imaging element 3 is disposed such that the imaging surface thereof is coplanar with the image plane of the zoom lens 1.

The imaging apparatus 10 also comprises a signal processing section 5 which performs calculation processing on an output signal from the imaging element 3, a display section 6 which displays an image formed by the signal processing section 5, and a zoom control section 7 which controls zooming of the zoom lens 1. It should be noted that FIG. 11 shows only one imaging element 3, but the imaging apparatus of the present invention is not limited to this, and may be a so-called three-plate imaging apparatus having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens are not limited to the values shown in the numerical examples, and different values may be used therefor.

EXPLANATION OF REFERENCES

1: zoom lens
2: filter
3: imaging element
5: signal processing section
6: display section
7: zoom control section
10: imaging apparatus
G1: first lens group
G2: second lens group G3: third lens group
G4: fourth lens group
G5: fifth lens group
G6: sixth lens group
G7: seventh lens group
L1a to L7a: lens
ma: on-axis rays at middle position
mb: rays with maximum angle of view at middle position
PP: optical member
SA: A constituent section
SB: B constituent section
SC: C constituent section
SD: D constituent section
SE: E constituent section
Sim: image plane
St: aperture stop
ta: on-axis rays at wide-angle end
tb: rays with the maximum angle of view at telephoto end
wa: on-axis rays at wide-angle end
wb: rays with the maximum angle of view at wide-angle end
Z: optical axis

What is claimed is:

1. A zoom lens comprising, in order from an object side:
a first lens group that remains stationary with respect to an image plane during zooming and has a positive refractive power; and
a subsequent section that comprises five or more lens groups including at least four movable lens groups which are moved by changing distances between the movable lens groups and adjacent groups in a direction of an optical axis during zooming,
wherein the first lens group is set as an A constituent section, and a lens closest to the object side in the A constituent section has a negative refractive power,
wherein one of the five or more lens groups has a stop, the one lens group having the stop is set as a C constituent section, and the C constituent section moves to the object side and then moves toward an image side during zooming from a wide-angle end to a telephoto end,
wherein only one or two movable lens groups of the at least four movable lens groups are disposed between the A constituent section and the C constituent section, and the only one or two movable lens groups disposed between the A constituent section and the C constituent section is set as a B constituent section, and the B constituent section has a negative refractive power as a whole at the wide-angle end, and
wherein assuming that a lateral magnification of the B constituent section at the telephoto end is $\beta TB$, a lateral magnification of the B constituent section at the wide-angle end is $\beta WB$, a focal length of the zoom lens at the telephoto end is fT, a focal length of the zoom lens at the wide-angle end is fW, and a zoom magnification defined by Zr=fT/fW is Zr,
Conditional Expression (1) is satisfied, $$1.3 < (\beta TB/\beta WB)/Zr < 5 \qquad (1).$$

2. The zoom lens according to claim 1,
wherein the C constituent section has a negative refractive power.
3. The zoom lens according to claim 1,
wherein the subsequent section has two or more movable lens groups of the at least four movable lens groups,
and the two or more movable lens groups have positive refractive powers on the image side of the C constituent section.
4. The zoom lens according to claim 1,
wherein the C constituent section is positioned to be closest to the object side within a movement range of the C constituent section, at a zoom region closer to a wide-angle side than a zoom state where a lateral magnification $\beta B$ of the B constituent section is −1.
5. The zoom lens according to claim 1,
wherein the stop of the C constituent section is at a position closest to the object side.
6. The zoom lens according to claim 1,
wherein the C constituent section consists of a stop, a positive lens, and a negative lens.
7. The zoom lens according to claim 1,
wherein a part of the subsequent section that is closer to the image than the C constituent section consists of, in order from the object side, two movable lens groups of the five or more lens groups that have positive refractive powers, and a stationary lens group of the five or more lens groups that remains stationary with respect to the image plane during zooming and has a positive refractive power.
8. The zoom lens according to claim 1,
wherein Conditional Expression (1-1) is satisfied, $$1.5 < \beta TB/\beta WB/Zr < 4 \qquad (1\text{-}1).$$

9. An imaging apparatus comprising the zoom lens according to claim 1.
10. The zoom lens according to claim 1,
wherein a lens group of the at least four movable lens groups closest to the image side of the C constituent section is a movable lens group having a positive refractive power, the movable lens group of the at least four movable lens groups closest to the image side of the C constituent section is a D constituent section, and all the lens groups of the five or more lens groups located to be closer to the image side than the D constituent section are combined to be set as an E constituent section, and
wherein assuming that a lateral magnification of the D constituent section at the telephoto end is $\beta TD$, a lateral magnification of the D constituent section at the wide-angle end is $\beta WD$, a lateral magnification of the E constituent section at the telephoto end is $\beta TE$, a lateral magnification of the E constituent section at the wide-angle end is $\beta WE$, an imaging forming position shift sensitivity of the D constituent section at the telephoto end is gtT, an imaging forming position shift sensitivity of the D constituent section at the wide-angle end is gtW, gtT is defined by gtT=$(1-\beta TD^2) \times \beta TE^2$, and gtW is defined by gtW=$(1-\beta WD^2) \times \beta WE^2$,
Conditional Expression (2) is satisfied, $$1.2 < gtT/gtW < 3 \qquad (2).$$

11. The zoom lens according to claim 10,
wherein Conditional Expression (2-1) is satisfied, $$1.5 < gtT/gtW < 2.5 \qquad (2\text{-}1).$$

12. The zoom lens according to claim 1,
wherein assuming that a focal length of the B constituent section at the wide-angle end is fB and a focal length of the A constituent section is fA,
Conditional Expression (3) is satisfied, $$-1 < fB/fA < 0 \qquad (3).$$

13. The zoom lens according to claim 12,
wherein Conditional Expression (3-1) is satisfied, $$-0.5<fB/fA<-0.1 \quad (3\text{-}1).$$

14. The zoom lens according to claim 1,
wherein assuming that a focal length of the C constituent section is fC, and a focal length of the B constituent section at the wide-angle end is fB,
Conditional Expression (4) is satisfied, $$2<fC/fB<4 \quad (4).$$

15. The zoom lens according to claim 14,
wherein Conditional Expression (4-1) is satisfied, $$2.5<fC/fB<3.7 \quad (4\text{-}1).$$

16. The zoom lens according to claim 1,
wherein assuming that an Abbe number at a d line is νd, and a partial dispersion ratio is θgF,
the A constituent section has two or more positive lenses, each of the two or more positive lenses satisfying Conditional Expressions (5) and (6), $$70<\nu d \quad (5)$$

$$0.64<\theta gF+0.001625\times \nu d<0.71 \quad (6).$$

17. The zoom lens according to claim 16,
wherein the positive lenses satisfying Conditional Expressions (5) and (6) satisfy at least one of Conditional Expressions (5-1) or (6-1), $$90<\nu d<99 \quad (5\text{-}1)$$

$$0.65<\theta gF+0.001625\times \nu d<0.70 \quad (6\text{-}1).$$

18. The zoom lens according to claim 1,
wherein the B constituent section consists of, in order from the object side, a movable lens group having a negative refractive power, and a movable lens group having a positive refractive power.

19. The zoom lens according to claim 18,
wherein assuming that a focal length of the movable lens group of the at least four movable lens groups having a negative refractive power in the B constituent section is fB1, and a focal length of the movable lens group of the at least four movable lens groups having a positive refractive power in the B constituent section is fB2,
Conditional Expression (7) is satisfied, $$-1<fB1/fB2<0 \quad (7).$$

20. The zoom lens according to claim 19,
wherein Conditional Expression (7-1) is satisfied, $$-0.5<fB1/fB2<-0.05 \quad (7\text{-}1).$$

\* \* \* \* \*